US010596697B2

(12) United States Patent
Dai et al.

(10) Patent No.: US 10,596,697 B2
(45) Date of Patent: Mar. 24, 2020

(54) ROBOT ASSEMBLING SYSTEM AND ROBOT ASSEMBLING METHOD FOR CONNECTOR ASSEMBLY

(71) Applicant: Tyco Electronics (Shanghai) Co. Ltd., Shanghai (CN)

(72) Inventors: Zhiyong Dai, Shanghai (CN); Lvhai Hu, Shanghai (CN); Yingcong Deng, Shanghai (CN); Lei Zhou, Shanghai (CN); Yun Liu, Shanghai (CN); Fengchun Xie, Shanghai (CN)

(73) Assignee: Tyco Electronics (Shanghai) Co. Ltd., Shanghai (CN)

( * ) Notice: Subject to any disclaimer, the term of this patent is extended or adjusted under 35 U.S.C. 154(b) by 0 days.

(21) Appl. No.: 16/159,187

(22) Filed: Oct. 12, 2018

(65) Prior Publication Data

US 2019/0039238 A1 Feb. 7, 2019

Related U.S. Application Data

(63) Continuation of application No. PCT/IB2017/051939, filed on Apr. 5, 2017.

(30) Foreign Application Priority Data

Apr. 13, 2016 (CN) .......................... 2016 1 0228481

(51) Int. Cl.
*B25J 9/00* (2006.01)
*B25J 15/00* (2006.01)
(Continued)

(52) U.S. Cl.
CPC .......... *B25J 9/0096* (2013.01); *B25J 9/0084* (2013.01); *B25J 15/009* (2013.01);
(Continued)

(58) Field of Classification Search
CPC .... B25J 9/0096; B25J 9/0084; B25J 15/0033; B25J 15/0047; B25J 15/0052;
(Continued)

(56) References Cited

U.S. PATENT DOCUMENTS 9,137,929 B1* 9/2015 Yang .................... H01R 12/724
2007/0233320 A1* 10/2007 Waldmann ........... B25J 15/0052
700/245

(Continued)

FOREIGN PATENT DOCUMENTS

EP 2492055 A1 8/2012
KR 10-0787186 B1 12/2007

OTHER PUBLICATIONS

PCT Notification of Transmittal of The International Search Report and The Written Opinion of the International Searching Authority, dated Aug. 23, 2017, 13 pages.

(Continued)

*Primary Examiner* — Zakaria Elahmadi
(74) *Attorney, Agent, or Firm* — Barley Snyder

(57) ABSTRACT

A robot assembling system comprises a first assembling workstation, a second assembling workstation, and a robot. The first assembling workstation is configured to assemble a contact of a connector assembly and a light guide pipe of the connector assembly to form a contact subassembly. The second assembling workstation is configured to assemble the contact subassembly and a cage to form the connector assembly. The robot is configured to transmit the cage, the light guide pipe, the contact, or the contact subassembly between the first assembling workstation and the second assembling workstation and configured to assist an assembling operation at the first assembling workstation and the second assembling workstation.

26 Claims, 19 Drawing Sheets

(51) Int. Cl.
*B25J 15/02* (2006.01)
*B25J 15/04* (2006.01)
*H01R 43/20* (2006.01)

(52) U.S. Cl.
CPC ....... *B25J 15/0033* (2013.01); *B25J 15/0047* (2013.01); *B25J 15/0052* (2013.01); *B25J 15/0057* (2013.01); *B25J 15/0253* (2013.01); *B25J 15/04* (2013.01); *H01R 43/20* (2013.01)

(58) Field of Classification Search
CPC .. B25J 15/0057; B25J 15/009; B25J 15/0253; B25J 15/04; H01R 43/20
See application file for complete search history.

(56) References Cited

U.S. PATENT DOCUMENTS

| | | | |
|---|---|---|---|
| 2015/0171558 A1* | 6/2015 | Yu | H01R 12/58 439/607.01 |
| 2016/0199886 A1* | 7/2016 | Schmidt-Schwan | B25J 15/0253 134/140 |
| 2018/0281207 A1* | 10/2018 | Tanaka | B25J 15/0052 |

OTHER PUBLICATIONS

Abstract of KR10-0787186, dated Dec. 24, 2007, 1 page.

\* cited by examiner

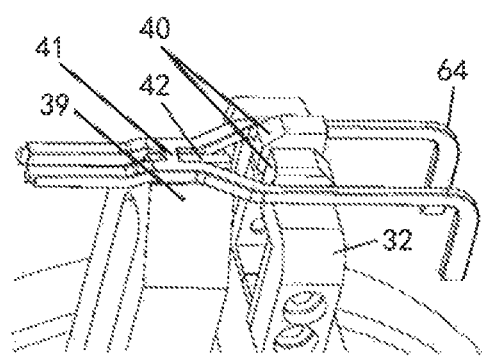
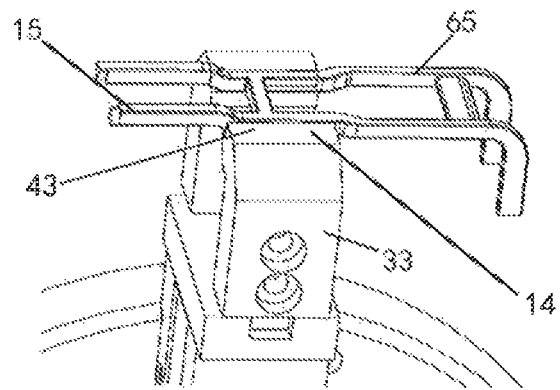
Fig. 9　　　　　　　　　　Fig. 10
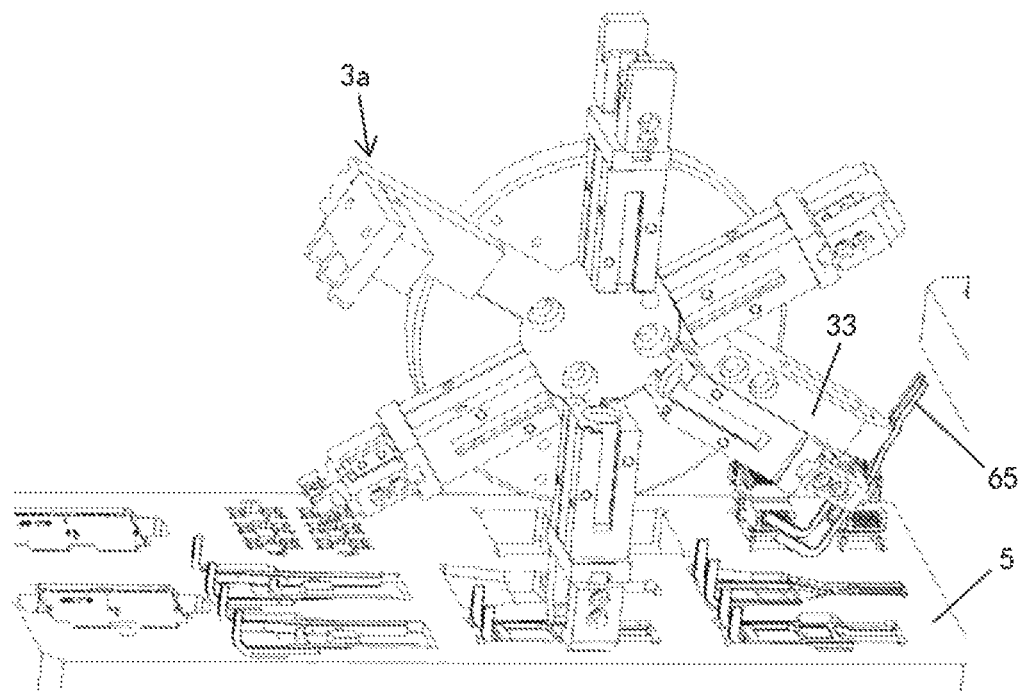
Fig. 11

ROBOT ASSEMBLING SYSTEM AND ROBOT ASSEMBLING METHOD FOR CONNECTOR ASSEMBLY

CROSS-REFERENCE TO RELATED APPLICATIONS

This application is a continuation of PCT International Application No. PCT/IB2017/051939, filed on Apr. 5, 2017, which claims priority under 35 U.S.C. § 119 to Chinese Patent Application No. 201610228481.0, filed on Apr. 13, 2016.

FIELD OF THE INVENTION

The present invention relates to a robot assembling system and, more particularly, to a robot assembling system for a connector assembly.

BACKGROUND

A connector assembly comprises a cage, a plurality of contacts, and a light guide pipe. The cage includes an outer cage, a middle vertical partition plate, and two horizontal partition plates connected to each side of the middle vertical partition plate. The middle vertical partition plate and the horizontal partition plates are constructed to divide an inner space of the cage into a plurality of chambers. The contacts are mounted in respective chambers of the cage. The light guide pipe is mounted on the contact and located in a space defined between the horizontal partition plates when the contact is mounted to the cage.

There are typically two types of connector assemblies that employ such a configuration. One type of connector assembly includes two contacts mounted in two chambers which are defined at left and right sides of the cage and separated by the middle vertical partition plate. The two contacts each have a first light guide pipe and a second light guide pipe which are integrated together by a connection member at ends of the first and second light guide pipes. The other type of connector assembly also includes two contacts mounted in two chambers which are defined at left and right sides of the cage and separated by the middle vertical partition plate. Each of the two contacts has a light guide pipe. A protrusion is formed at an inner side of two horizontal partition plates at each side of the middle vertical partition plate of the cage, and the protrusion is located on an extension path of the light guide pipe.

Assembly of the light guide pipe and the contact together to form a contact sub-assembly and assembly of the contact sub-assembly and the cage together to form the connector assembly are all performed manually. Thus, the efficiency of the whole assembly operation is low, and during assembling, the contact sub-assembly and especially the light guide pipe may easily collide with the cage, damaging the light guide pipe.

SUMMARY

A robot assembling system comprises a first assembling workstation, a second assembling workstation, and a robot. The first assembling workstation is configured to assemble a contact of a connector assembly and a light guide pipe of the connector assembly to form a contact subassembly. The second assembling workstation is configured to assemble the contact subassembly and a cage to form the connector assembly. The robot is configured to transmit the cage, the light guide pipe, the contact, or the contact subassembly between the first assembling workstation and the second assembling workstation and configured to assist an assembling operation at the first assembling workstation and the second assembling workstation.

BRIEF DESCRIPTION OF THE DRAWINGS

The invention will now be described by way of example with reference to the accompanying Figures, of which:

FIG. 9 is a perspective view of a state of the first light guide pipe being clamped by a second tool of the first operating mechanism of the robot;

FIG. 10 is a perspective view of a second light guide pipe being clamped by a third tool of the first operating mechanism of the robot;

FIG. 11 is a perspective view of the robot picking up a second light guide pipe from the storage tray;

DETAILED DESCRIPTION OF THE EMBODIMENT(S)

Figure 1:
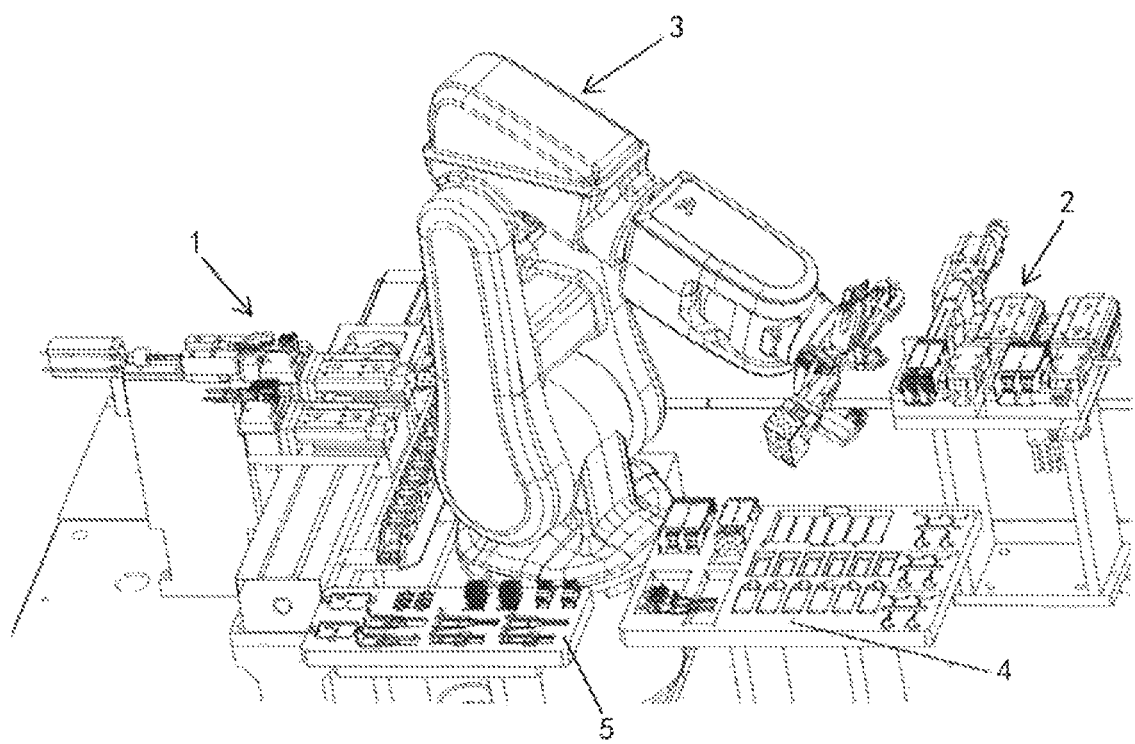
FIG. 1 is a perspective view of a robot assembling system according to an embodiment.

Exemplary embodiments of the present disclosure will be described hereinafter in detail with reference to the attached drawings, wherein like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

A robot assembling system according to an embodiment is shown in FIG. 1. The robot assembling system comprises a first assembling workstation 1 configured to assemble a contact and light guide pipes to form a contact sub-assembly, a second assembling workstation 2 configured to assemble the contact sub-assembly and the cage to form a connector assembly, and a robot 3 configured to transmit the cage, the light guide pipes, the contact or the contact sub-assembly between respective assembling workstations and assist an assembly process at each assembling workstation. In an embodiment, the robot 3 is configured to identify components based on the preset program, so as to control a gripper to grip the corresponding component and place the gripped component at a predetermined position.

Figure 2:
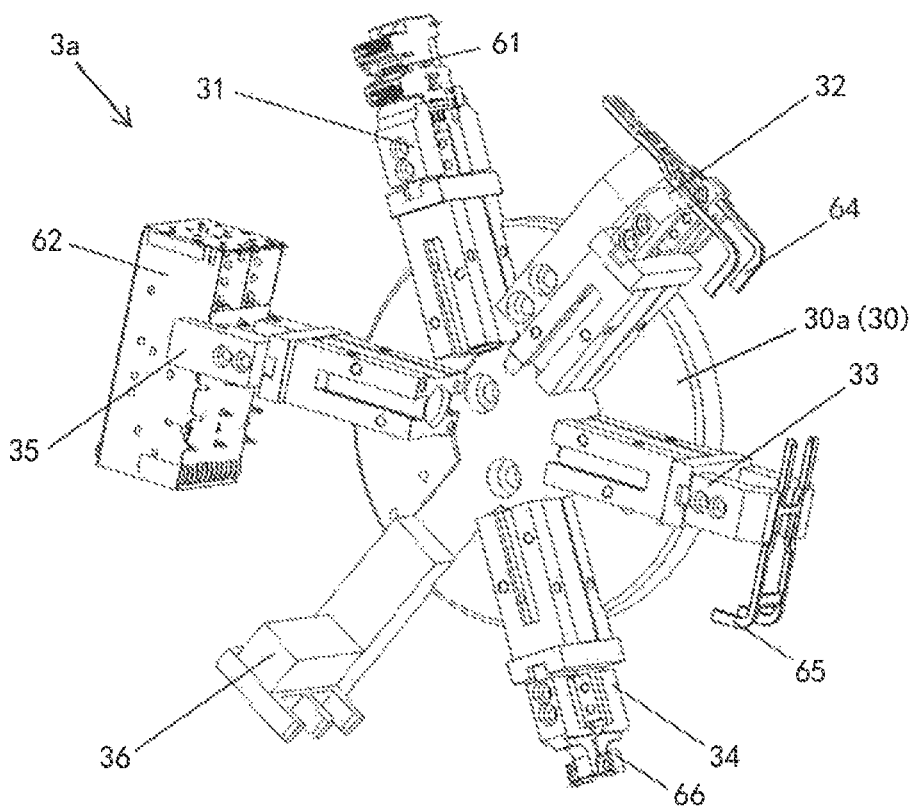
FIG. 2 is a perspective view of a first operating mechanism of the robot of FIG. 1.
Figure 3:
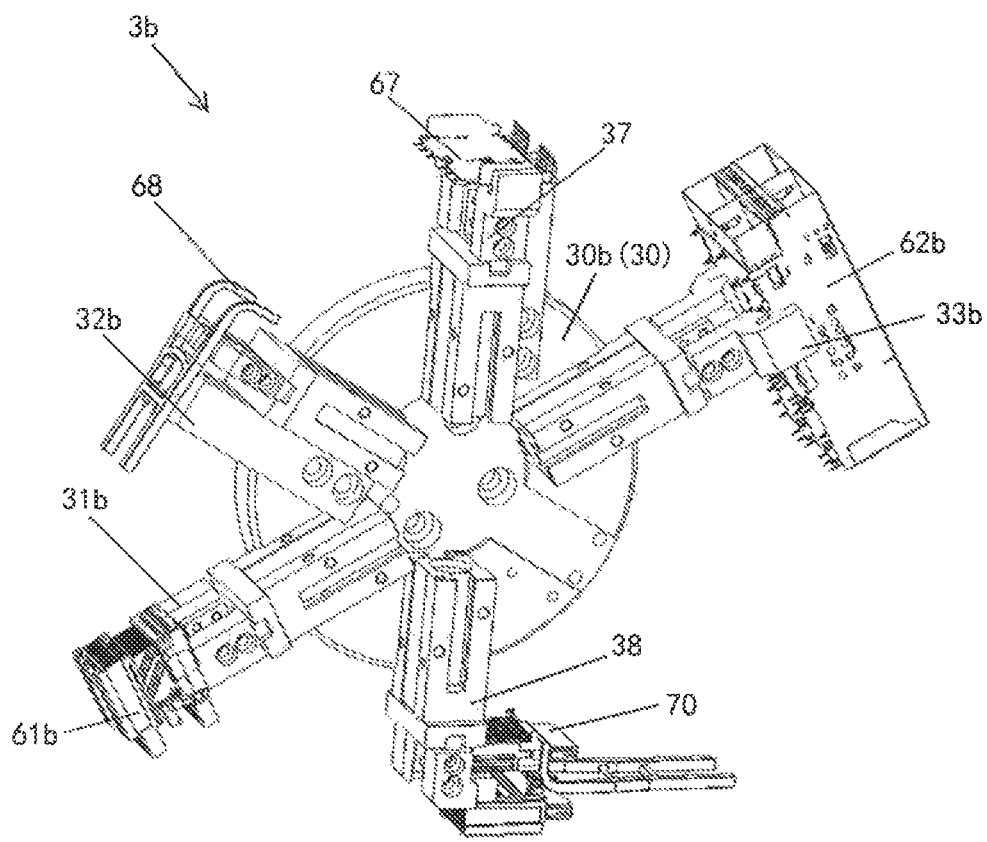
FIG. 3 is a perspective view of a second operating mechanism of the robot of FIG. 1.

As shown in FIGS. 1-3, the robot 3 comprises a rotatable operating mechanism 3a. The rotatable operating mechanism 3a includes a rotary disc 30 and a plurality of tools 31-36 arranged on the rotary disc 30 along a circumferential direction of the rotary disc 30 and adapted to manipulate different operation objects. When the rotary disc 30 is rotated to an operation position of one of the plurality of tools 31-36, the one tool is adapted to manipulate the operation object and the others of the plurality of tools 31-36 are in a non-operation position. According to the above configuration, tools for different operation objects may be quickly switched by rotating the rotary disc 30. The tool in use may be rotated to the lowest position for performing the picking and assembling operations while the other tools are rotated to other positions to avoid interference. In this way, the robot 3 carries more tools in a limited space to perform the assembly operations. As shown in the embodiments of FIGS. 2 and 3, the robot 3 includes a plurality of interchangeable operating mechanisms 3a, 3b configured to assemble different types of connector assemblies.

Figure 4:
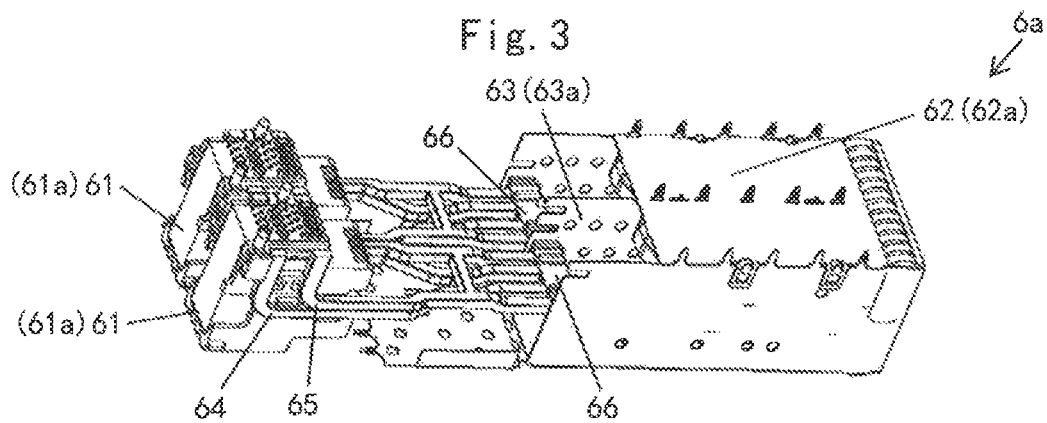
FIG. 4 is an exploded perspective view of a first connector assembly assembled by the robot assembling system of FIG. 1.

FIG. 2 shows a working state of a first operating mechanism 3a of the robot 3. The first operating mechanism 3a shown in FIG. 2 is used to assemble a first connector assembly 6a shown in FIG. 4. As shown in FIG. 4, the first connector assembly 6a comprises two contacts 61a (61) mounted in two chambers which are located at left and right sides of the cage 62 and separated by the middle vertical partition plate 63 (63a). The contacts 61a (61) each include a first light guide pipe 64 and a second light guide pipe 65 which are integrated together by a connection member 66 at ends of the first and second light guide pipes 64, 65.

Figure 13:
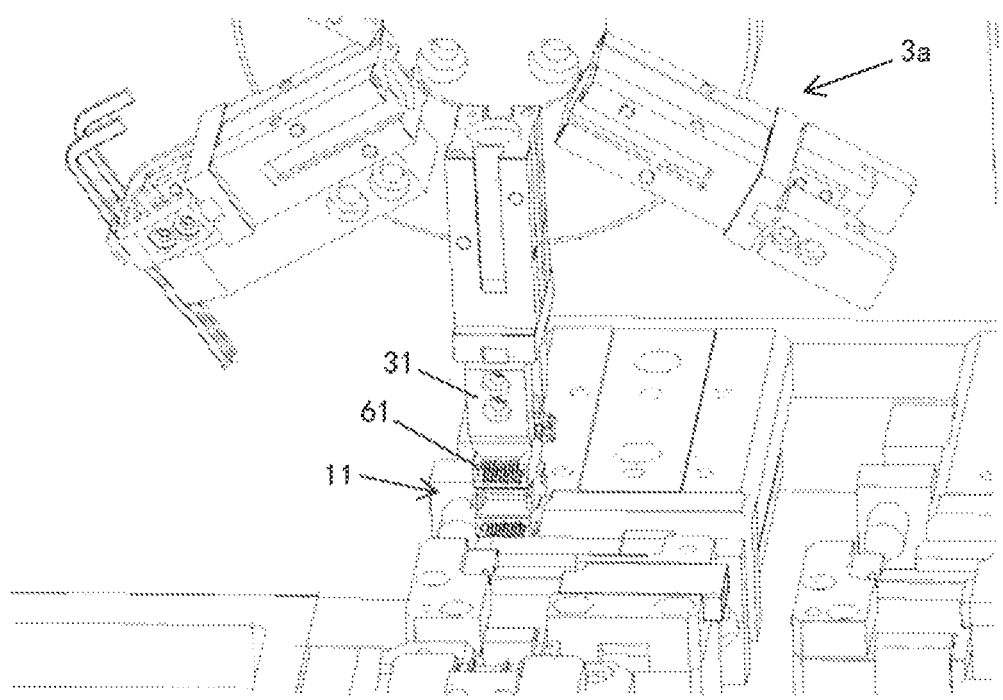
FIG. 13 is a perspective view of loading the contact to a loading portion of the first assembling workstation by a first gripper of the first operating mechanism.
Figure 18:
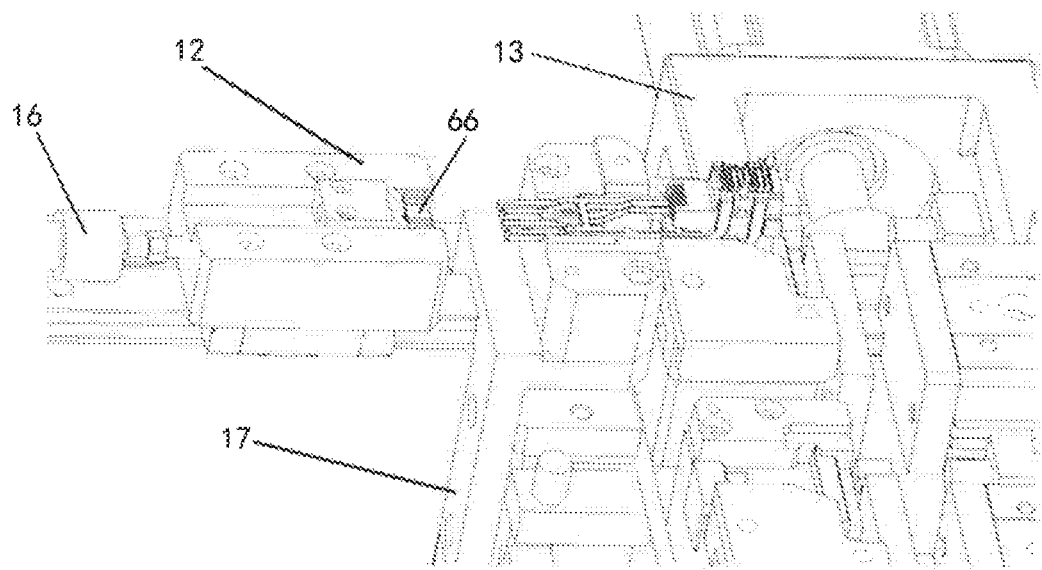
FIG. 18 is a perspective view of the contact holding portion of the first assembling workstation moving to clamp the contact.

In order to assemble the first connector assembly 6a, the first assembling workstation 1 comprises a contact loading portion 11 as shown in FIG. 13 configured to load the contact 61, and a connection member loading portion 12 as shown in FIG. 18 configured to load the connection member 66. The second assembling workstation 2 comprises a cage loading portion 21 shown in FIG. 22 configured to load the cage 62 (62a). The second assembling workstation 2 may further comprise a locking mechanism configured to lock the cage 62 in a horizontal direction and a vertical direction.

As shown in FIG. 2, the plurality of tools of the robot 3 include a first tool 31 configured to clamp the contact 61 and load the contact 61 to the contact loading portion, a second tool 32 configured to clamp the first light guide pipe 64 and load the first light guide pipe 64 to the contact 61, a third tool 33 configured to clamp the second light guide pipe 65 and load the second light guide pipe 65 to the contact 61, a fourth tool 34 configured to clamp the connection member 66 and load the connection member 66 to the connection member loading portion, a fifth tool 35 configured to clamp the cage 62 and load the cage 62 to the cage loading portion, and a sixth tool 36 configured to perform an auxiliary function. It should be appreciated for those skilled in this art that the number and type of the tools mounted on the first operating mechanism 3a may be increased or decreased as needed.

The tools 31-36 on the first operating mechanism 3a each has a mating structure mated with a structure of a respective component to be gripped, so as to grip the respective component. For example, FIG. 9 shows a state of the first light guide pipe 64 being clamped by a second tool 32 of the first operating mechanism 3a of the robot 3. As shown in FIG. 9, the second tool 32 comprises two claws 40. Each of the two claws 40 is provided with a slot, which has a size and a shape corresponding to those of the first light guide pipe 64, to receive two legs of the first light guide pipe 64 therein. The two claws 40 are configured to be moved toward or away from each other. When the two claws 40 are moved away from each other by a certain distance, the two claws 40 may reliably hold the two legs of the light guide pipe 64. The second tool 32 may further comprise a supporting member 39 configured to support the first light guide pipe 64. A protruding rib 42 is formed on the supporting member 39, and a groove for positioning a lateral rod 41 of the light guide pipe 64 is formed in the protruding rib 42. In this way, the first light guide pipe 64 may be precisely positioned and held.

FIG. 10 shows a state of the second light guide pipe 65 being clamped by a third tool 33 of the first operating mechanism 3a of the robot 3. As shown in FIG. 10, the third tool 33 comprises two claws 43. Each of the two claws 43 has a shoulder, which is a size and a shape corresponding to those of the second light guide pipe 65, for supporting and clamping two legs of the second light guide pipe 65. The two claws 43 may be movable toward or away from each other. It should be appreciated for those skilled in this art that the structures of the tools may be designed according to the shape and the structure of the components to be clamped.

Figure 6:
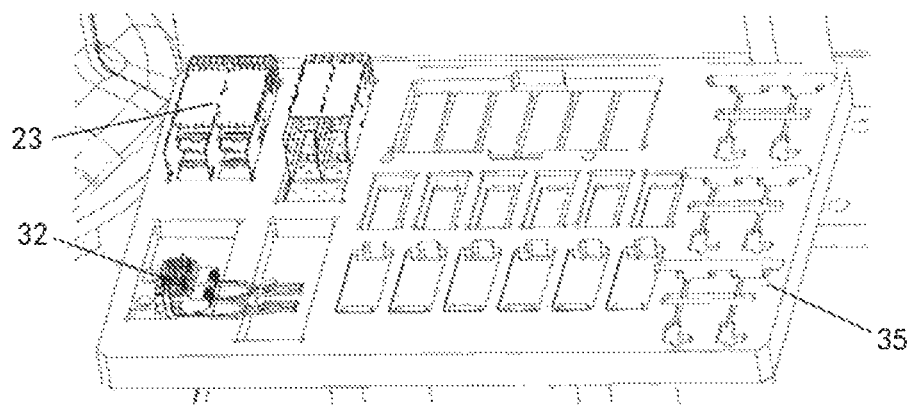
FIG. 6 is a perspective view of a storage of the robot assembling system of FIG. 1.
Figure 7:
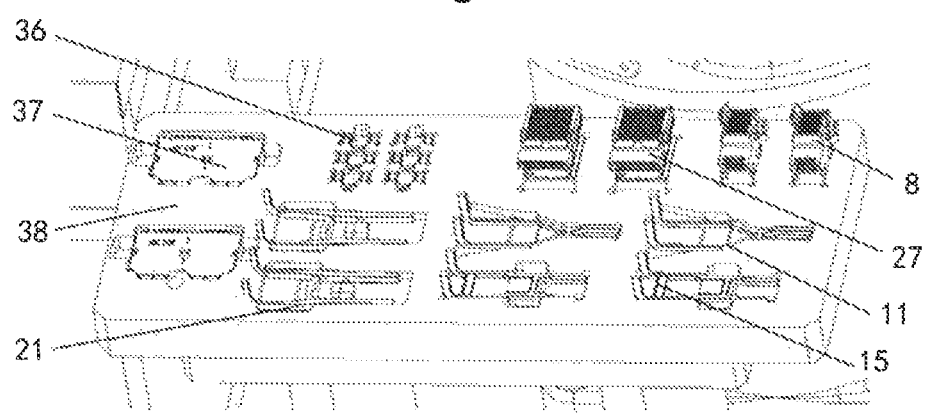
FIG. 7 is a perspective view of another storage tray of the robot assembling system of FIG. 1.

In an embodiment shown in FIGS. 1, 6, and 7, the robot assembling system 3a may further comprise a storage tray 4 for storing cages, contact sub-assemblies and the like, a storage tray 5 for storing cages, light guide pipes, connection members, rear covers and the like. It should be appreciated that the two storage trays 4, 5 may be combined into a single storage tray.

Figure 8:
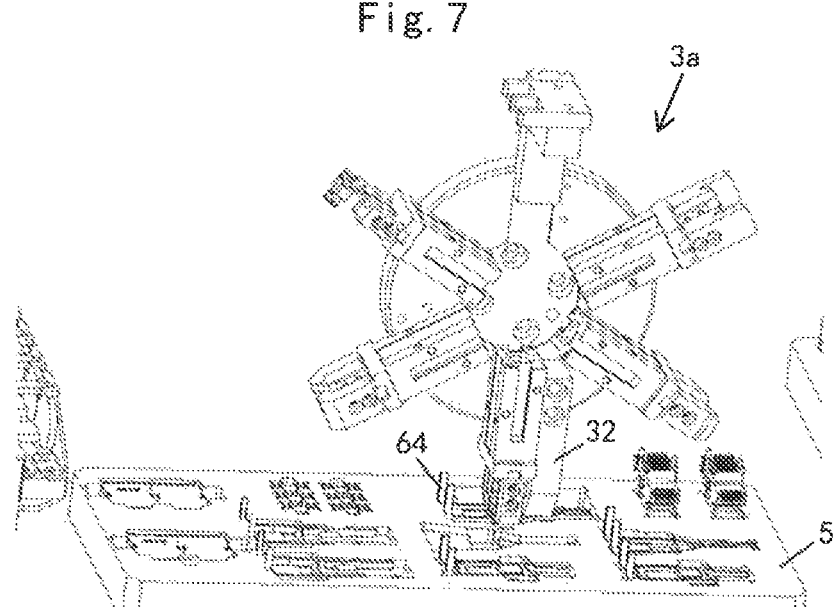
FIG. 8 is a perspective view of the robot picking up a first light guide pipe from the storage tray.
Figure 12:
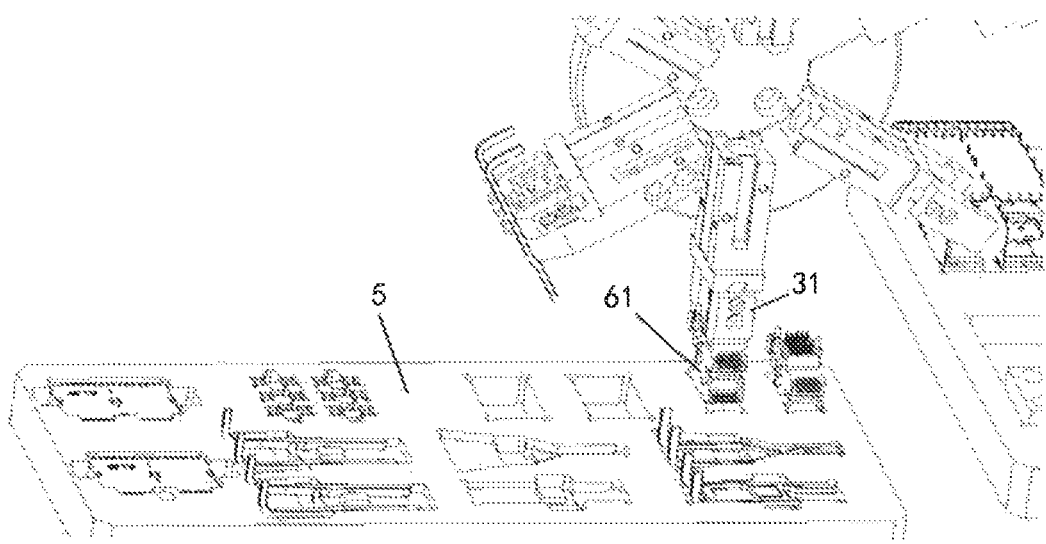
FIG. 12 is a perspective view of the robot picking up a contact from the storage tray.

FIGS. 8-12 are illustrative views of picking up components of the contact sub-assembly of the first connector assembly 6a from the storage tray 5 by various tools of the first operating mechanism 3a of the robot 3. As shown in FIG. 8, the second tool 32 is configured to pick up the first light guide pipe 64 from the storage tray 5. FIG. 9 shows a state of the first light guide pipe 64 being clamped by the second tool 32. As shown in FIG. 11, the third tool 33 is configured to pick up the second light guide pipe 65 from the storage tray 5. As shown in FIG. 12, the first tool 31 is configured to pick up the contact 61 from the storage tray 5.

Figure 14:
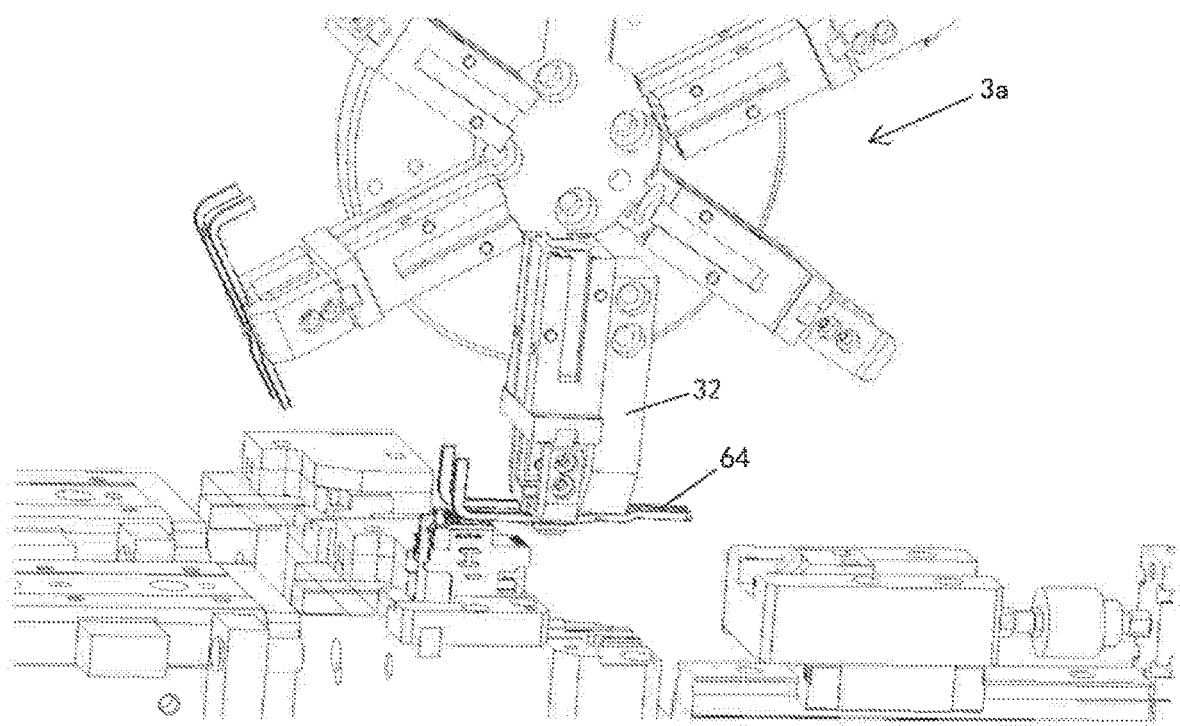
FIG. 14 is a perspective view of a first step of loading the first light guide pipe to the contact by a second gripper of the first operating mechanism.
Figure 15:
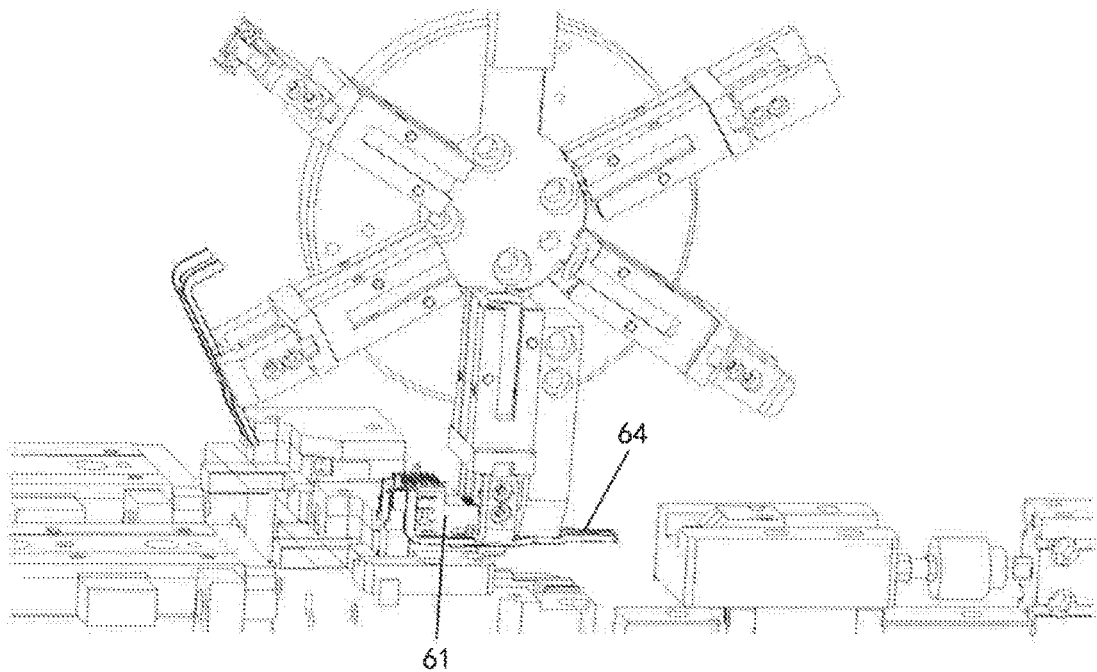
FIG. 15 is a perspective view of a second step of loading the first light guide pipe to the contact by the second gripper of the first operating mechanism.
Figure 16:
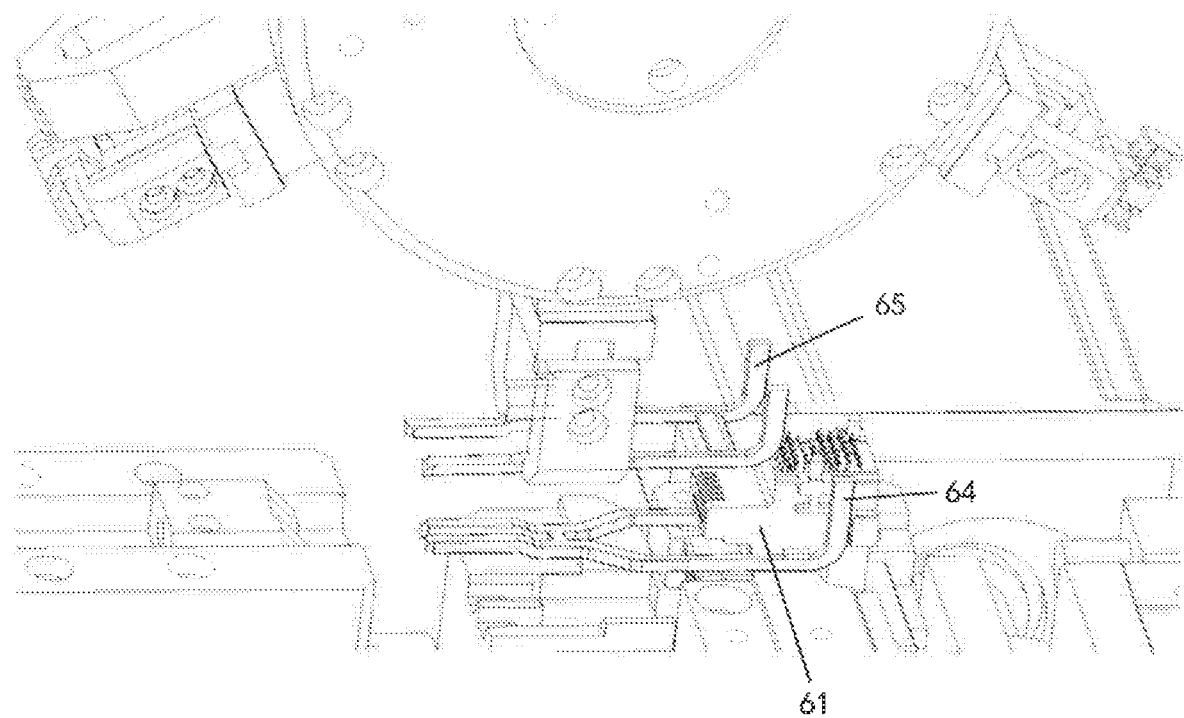
FIG. 16 is a perspective view of a first step of loading the second light guide pipe to the contact by a third gripper of the first operating mechanism.
Figure 17:
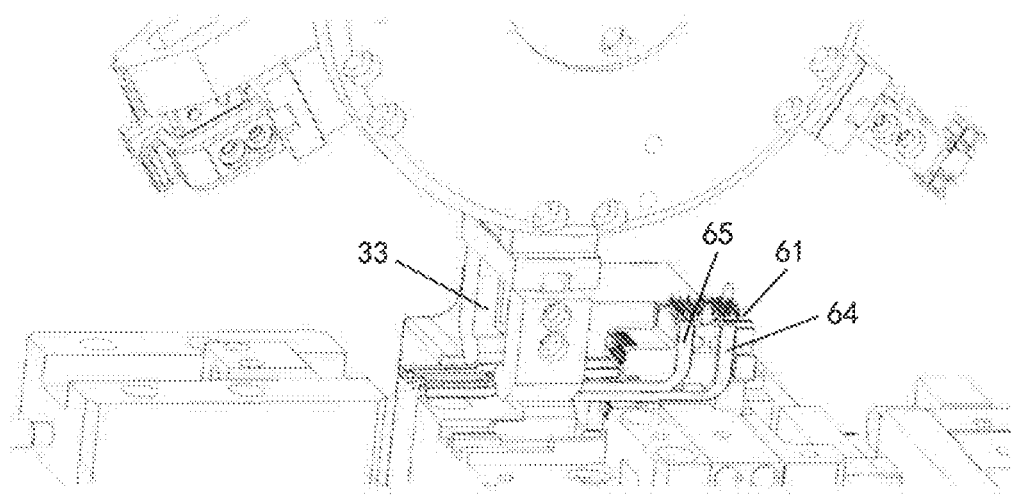
FIG. 17 is a perspective view of a second step of loading the second light guide pipe to the contact by the third gripper of the first operating mechanism.
Figure 19:
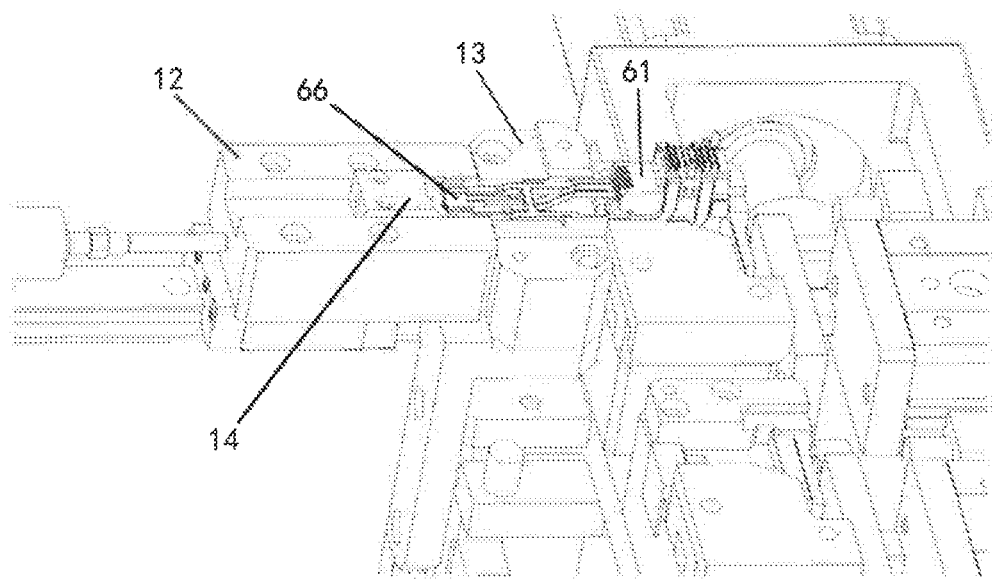
FIG. 19 is a perspective view of a connection member loading portion of the first assembling workstation pushing the connection member toward the contact.

FIGS. 13-20 show a process of assembling the contact sub-assembly of the first connector assembly 6a on the first assembling workstation 1. The contact sub-assembly comprises a contact 61, light guide pipes 64, 65 and a connection member 66. As shown in FIG. 13, the first tool 31 is operated to load the contact 61 to the loading portion 11 of the first assembling workstation 1. The first assembling workstation 1 may comprise a locking mechanism for locking the contact 61 at a fixation position. Then, as shown in FIGS. 14-15, the second tool 32 is operated to load the first light guide pipe 64 to the contact 61. Then, as shown in FIGS. 16-17, the third tool 33 is operated to load the second light guide pipe 65 to the contact 61. In this state, as shown in FIG. 18, the contact holding portion 13 of the first assembling workstation 1 is moved up to clamp the contact 61, and align the light guide pipes 64 and 65 on the contact 61 to the connection member 66. Then, as shown in FIG. 19, the connection member 66 is pushed toward the contact 61 by an air nozzle block 14 on the connection member loading portion 12 of the first assembling workstation 1.

Figure 20:
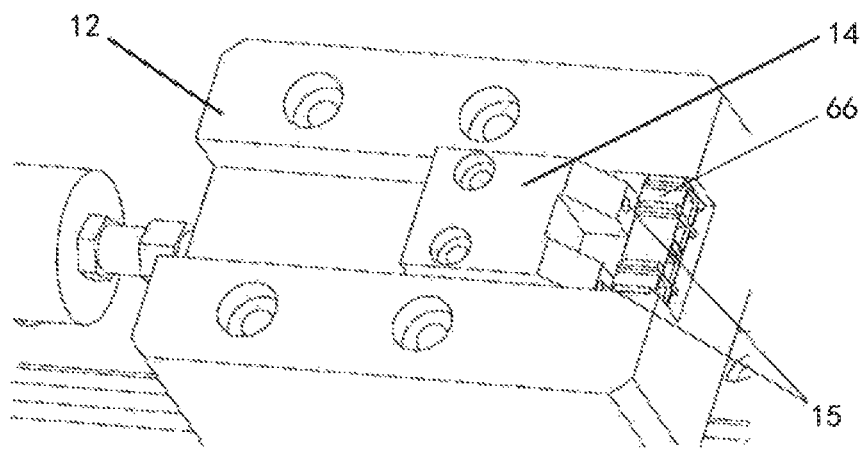
FIG. 20 is a perspective view of an air nozzle block on the connection member loading portion.

As shown in FIG. 20, the air nozzle block 14 has an air nozzle 15 for spraying air to push the connection member 66. The connection member 66 is provided with insertion holes. The connection member 66 is moved to the first light guide pipe 64 and the second light guide pipe 65 under the pushing of air, so that ends of the first light guide pipe 64 and the second light guide pipe 65 are inserted into insertion holes of the connection member 66, respectively. The air nozzle 14 advantageously provides a means of assembling the connection member 66 to the light guide pipe 64 without damaging the light guide pipe 64. In this way, a first contact sub-assembly including the light guide pipes 64, 65, the connection member 66, and the contact 61 is formed. Then, the above processes are repeated to form a second contact sub-assembly which is the same as the first contact subassembly.

In order to perform the above processes, the first assembling workstation 1 may further comprise: a first driving mechanism 16 configured to drive the connection member loading portion to move in the first direction to a position aligned to the contact 61, and a second driving mechanism 17 configured to drive the contact holding portion 13 to move in a second direction perpendicular to the first direction.

Figure 21:
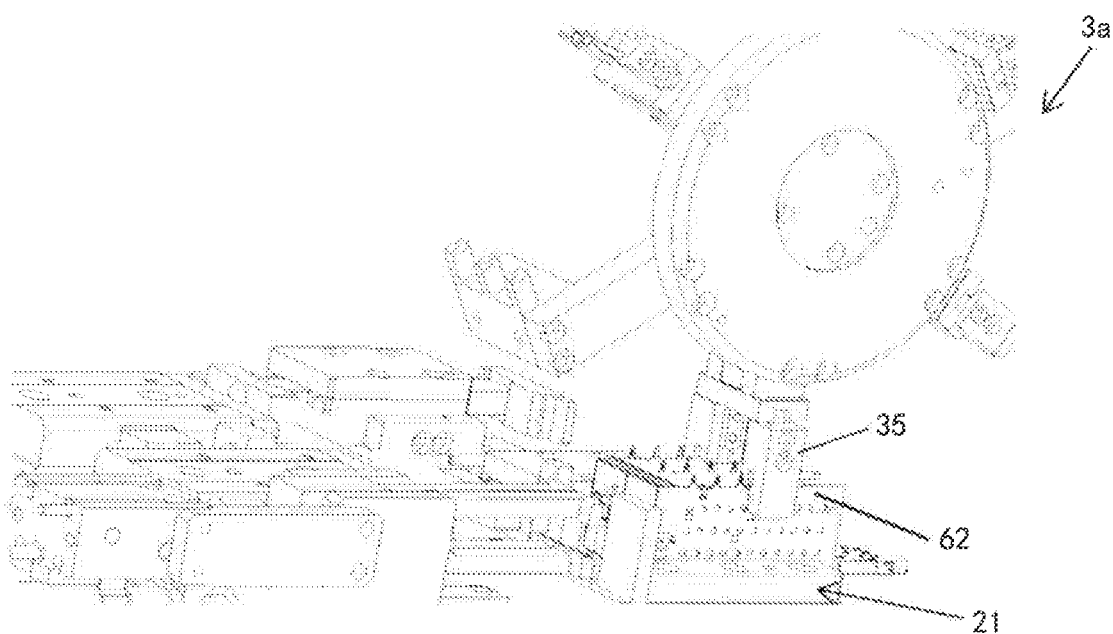
FIG. 21 is a perspective view of loading the cage to a loading portion of the second assembling workstation by a fourth gripper of the first operating mechanism.
Figure 22:
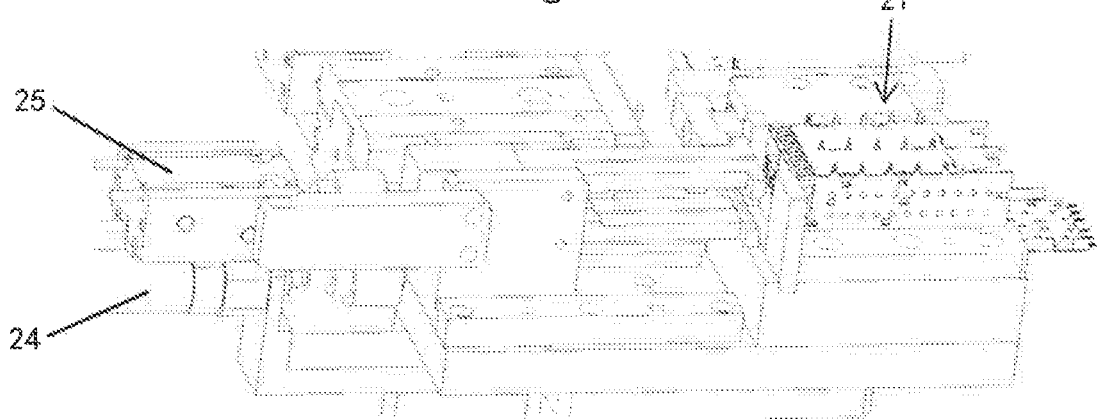
FIG. 22 is a perspective view of the cage loaded on the loading portion of the second assembling workstation.
Figure 23:
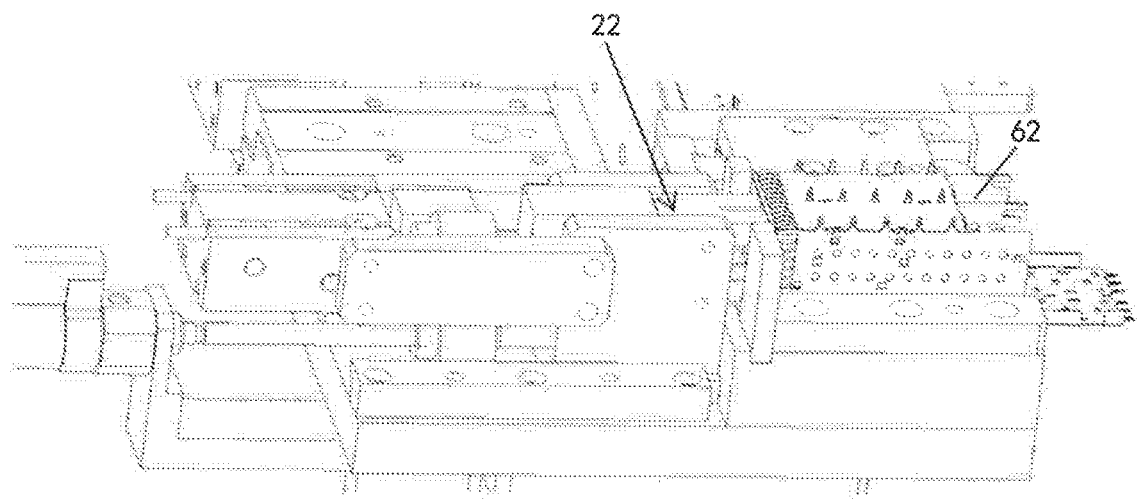
FIG. 23 is a perspective view of a guiding mechanism of the second assembling workstation moved into the cage.

After two contact sub-assemblies are formed as described above on the first assembling workstation 1, the two contact sub-assemblies are assembled to the cage on the second assembling workstation 2 to form the connector assembly. Firstly, as shown in FIG. 21, the fifth tool 35 on the first operating mechanism 3a of the robot 3 is operated to load the cage 62 to the loading portion 21 of the second assembling workstation 2. FIG. 22 is an illustrative view showing that the cage 62 has been loaded on the loading portion 21 of the second assembling workstation 2.

FIGS. 23-30 and 32 show operations of assembling the two contact sub-assemblies to the cage 62 under the guidance of a guiding mechanism 22. As shown in FIGS. 23-32, the second assembling workstation 2 further comprises the guiding mechanism 22 adapted to be inserted into the cage 62 and configured to guide an integrated component, shown in FIG. 29, which is formed by the light guide pipe 64, 65 and the connection member 66, to be inserted between two horizontal partition plates 69a at each side of the cage 62 without colliding ends of the horizontal partition plates 69a. The ends of the two horizontal partition plates 69a may be connected together to form a single component by a connection plate. In an embodiment, the guiding mechanism 22 is not limited to embodiments in which the cage 62 comprises a pair of horizontal partition plates 69a, and the guiding mechanism 22 is also suitable for a cage 62 comprising a plurality of pairs of horizontal partition plates 69a. The guiding mechanism 22 may be provided between each pair of horizontal partition plates 69a.

In an embodiment shown in FIGS. 23-27, the guiding mechanism 22 comprises two cover plates 220 adapted to be respectively covered on outer sides of the two horizontal partition plates 69a at each side of the cage 62. Each of the cover plates 220 comprises a hook 220a formed on an end thereof and configured to cover the ends of the horizontal partition plates 69a, and the hook 220a comprises a guiding slope face 220b formed on an outer side thereof and configured to guide the insertion of the light guide pipes 64, 65 and the connection member 66.

Figure 24:
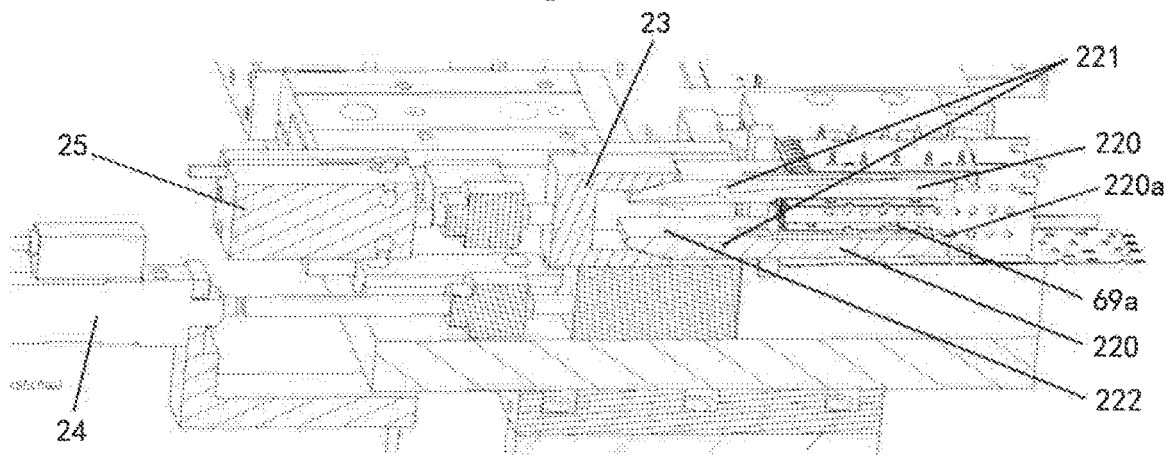
FIG. 24 is a sectional perspective view of the guiding mechanism of FIG. 23.
Figure 25:
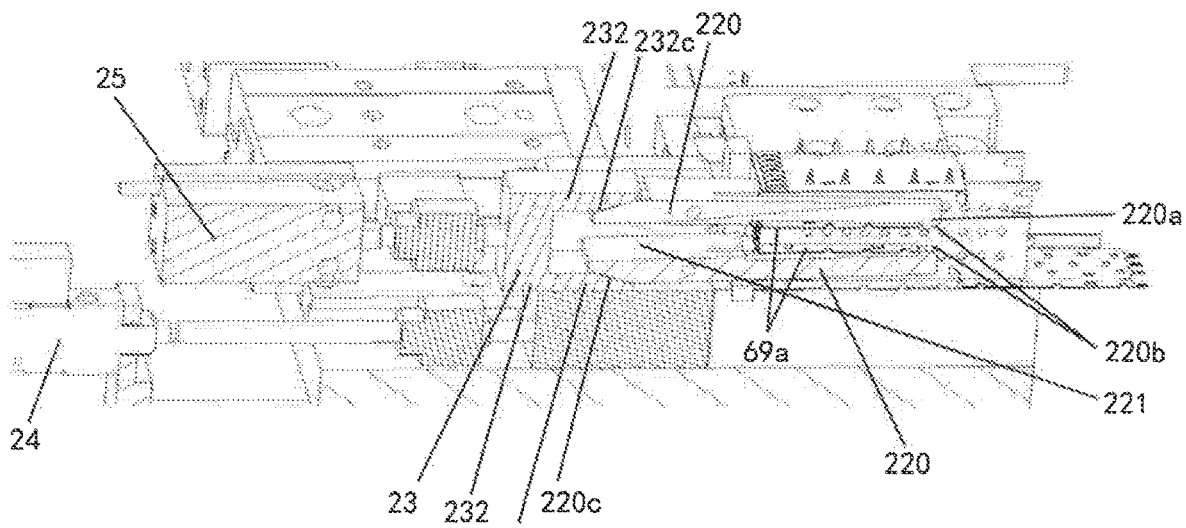
FIG. 25 is a sectional perspective view of the guiding mechanism of FIG. 23 in a closed state.
Figure 26:
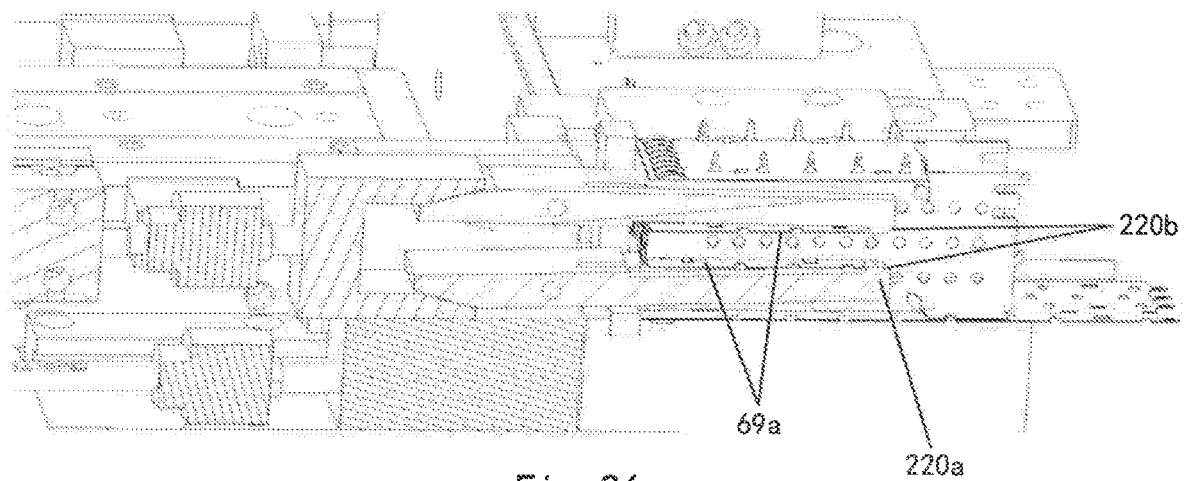
FIG. 26 is a detailed sectional perspective view of the guiding mechanism of FIG. 23.
Figure 27:
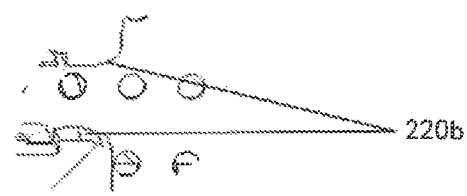
FIG. 27 is another detailed sectional perspective view of the guiding mechanism of FIG. 23.

As shown in FIGS. 24-26, each of the two cover plates 220 of the guiding mechanism 22 comprises a pivotal pin 221. Each of the cover plates 220 may be pivoted about the pivotal pin 221 fixed on the second assembling workstation 2. Thereby, the two cover plates 220 may be pivotally opened and closed relative to each other. As shown in FIG. 25, when the two cover plates 220 are closed, the ends of the horizontal partition plates 69a are covered by the hooks 220a of the two cover plates 220.

As shown in FIGS. 24-26, a spring 222 is provided between the two cover plates 220. The spring 222 is connected between two pivotal pins 221 and configured to close the two cover plates 220 by biasing the two cover plates 220, and the ends of the horizontal partition plates 69a are covered by the hooks 220a.

An inclined surface 220c, as shown in FIGS. 24-26, is formed on an end of each cover plate 220 opposite to the hook 220a. The second assembling workstation 2 further comprises a U-shaped member 23 comprising two sidewalls, on ends of which an inclined face 232c mated with the inclined surface 220c is formed, so that a distance between the two cover plates 220 is changeable when the inclined face 232c of the U-shaped member 23 slides along the inclined surface 220c of the two cover plates.

As shown in FIGS. 24-25, in order to drive the guiding mechanism 22 into the cage 62, the second assembling workstation 2 further comprises a first driving mechanism 24 and a second driving mechanism 25. The first driving mechanism 24 is configured to drive the guiding mechanism 22 to move into or out of the cage 62. The second driving mechanism 25 is configured to drive the U-shaped member 23 to move toward or away from the guiding mechanism 22. In an embodiment, the first driving mechanism 24 and the second driving mechanism 25 may comprise an air cylinder.

Figure 28:
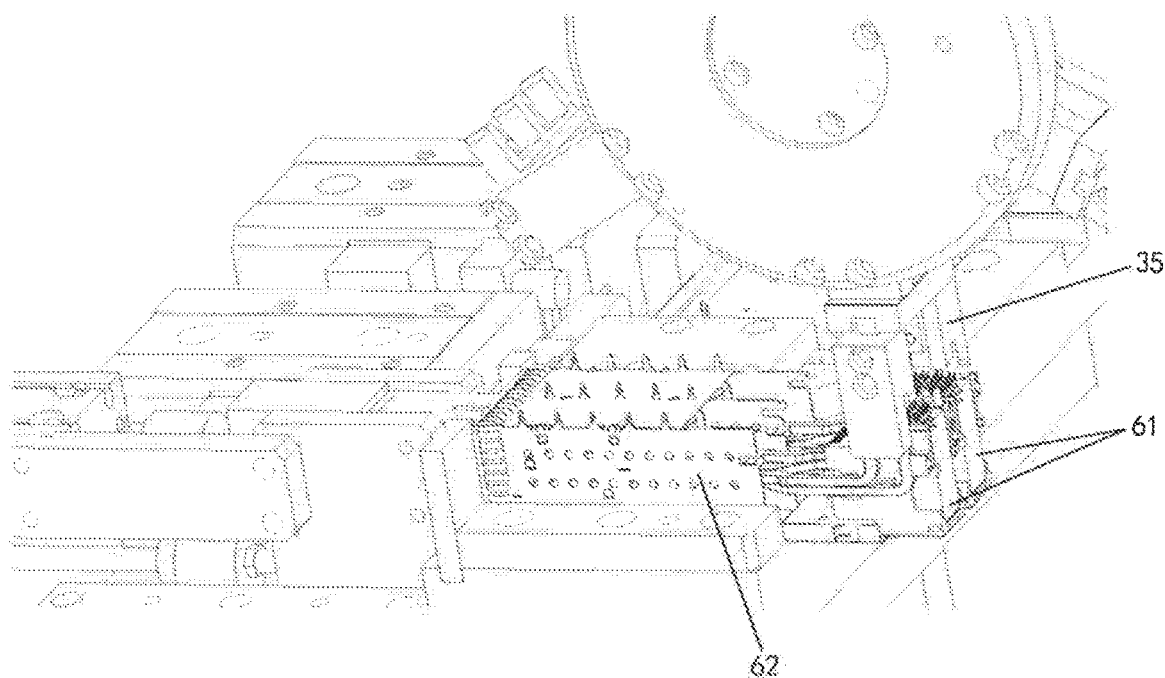
FIG. 28 is a perspective view of loading two contact sub-assemblies arranged side by side to the cage on the second assembling workstation by a fifth gripper of the first operating mechanism.
Figure 29:
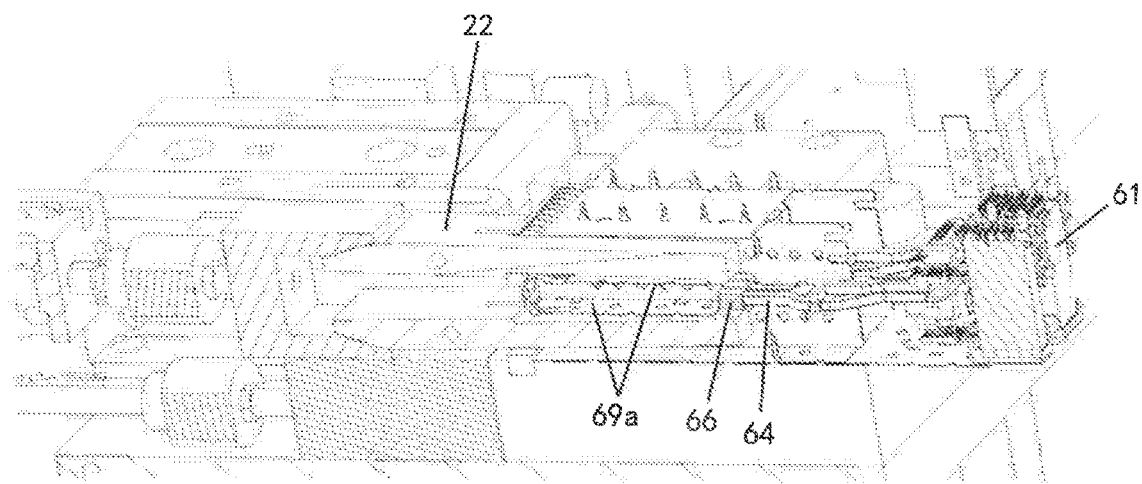
FIG. 29 is a sectional perspective view of inserting the two contact sub-assemblies into the cage.
Figure 30:
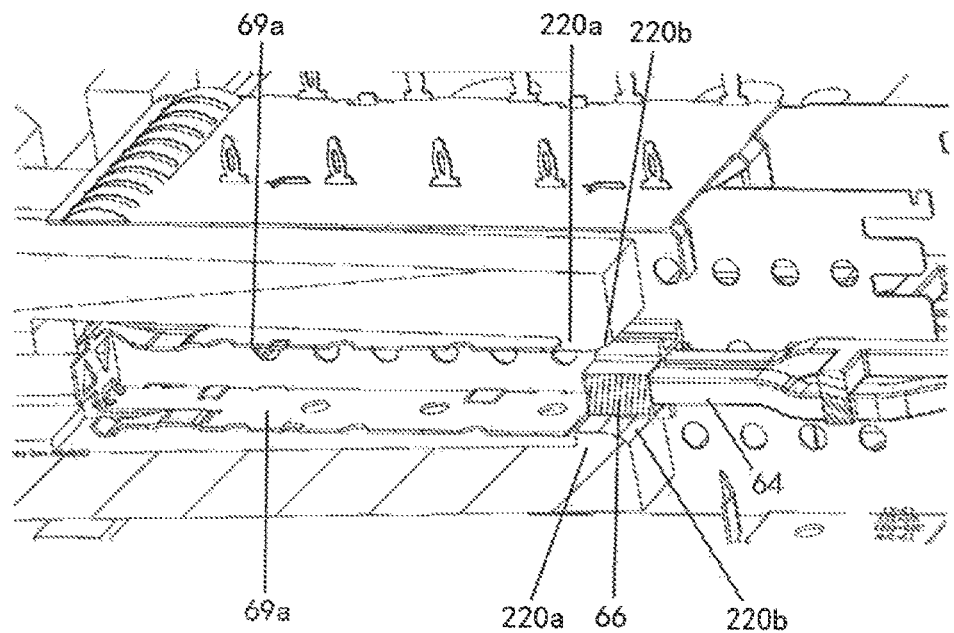
FIG. 30 is an enlarged sectional perspective view of the two contact sub-assemblies of FIG. 29.
Figure 32:
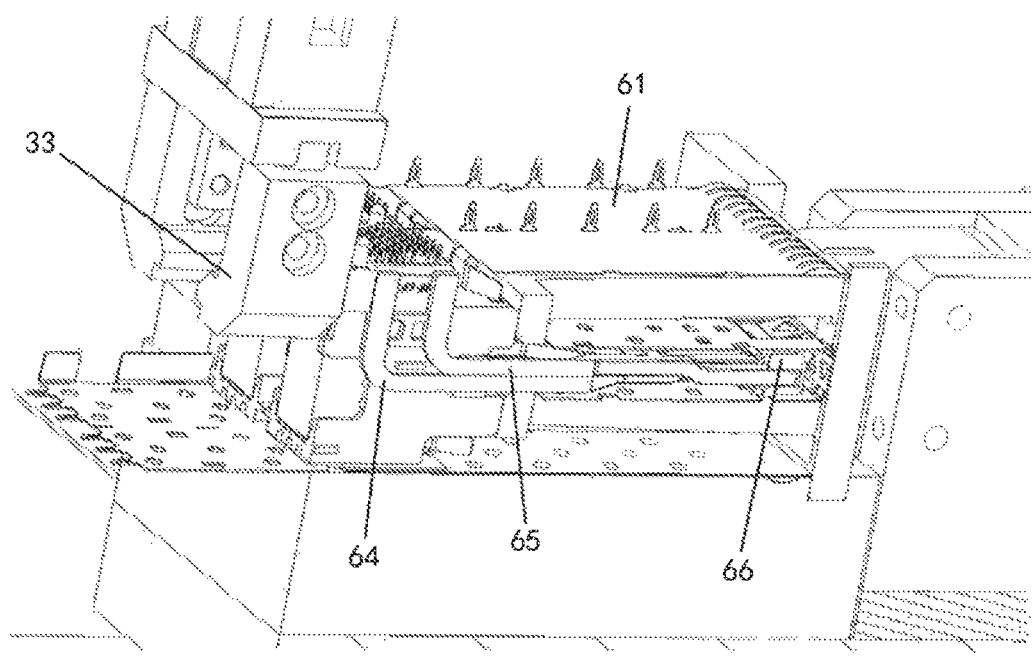
FIG. 32 is a sectional perspective view of pushing the contact sub-assembly to an installation location in the cage by a gripper of the first operating mechanism.

FIG. 28 is an illustrative view of loading two contact subassemblies arranged side by side to the cage 62 on the second assembling workstation 2 by a fifth gripper 35 of the first operating mechanism 3a; FIG. 29 is a cross sectional view of inserting the two contact subassemblies into the cage 62; FIG. 30 is a local enlarged view of the guiding mechanism 22 of FIG. 29. As shown in FIGS. 28-30, when the two contact subassemblies are inserted into the cage 62, the connection member 66 at ends of the light guide pipes 64, 65 may be smoothly inserted between the horizontal partition plates 69a of the cage 62 under the guidance of the inclined face 220b on the hook 220a of the guiding mechanism 22 without colliding with the horizontal partition plates 69a, and it prevents the connection member 66 from being damaged. FIG. 32 is a cross sectional view of pushing the contact sub-assembly to an installation location in the cage 62 by the gripper 33 of the first operating mechanism 3a.

Figure 31:
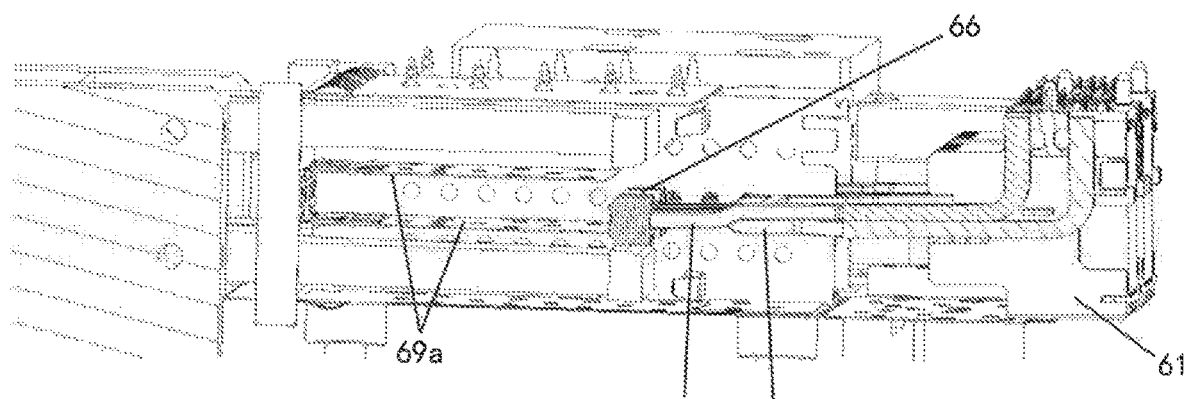
FIG. 31 is a sectional view of a state of a collision between the connection member of the light guide pipe and a horizontal partition plate of the cage when the guiding mechanism is not in use.

Compared with the embodiments shown in FIGS. 28-30, FIG. 31 is a cross sectional view of a state of collision between the connection member 66 of the light guide pipes 64, 65 and the horizontal partition plate 69a of the cage 62 when the guiding mechanism 22 is opened and is not in use. In the state of collision as shown in FIG. 31, it is difficult to assemble the connector assembly, affecting the whole assembly process. In addition, because the connection member 66 is generally formed of a plastic component, the connection member 66 is very easy to break when it collides with the metal horizontal partition plate 69a.

Figure 42:
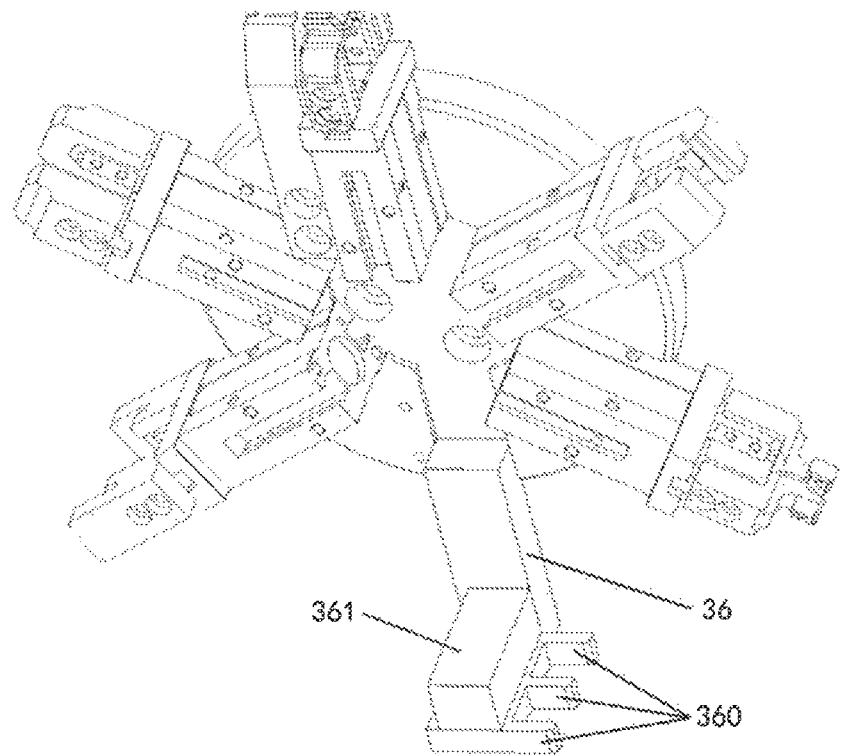
FIG. 42 is a perspective view of the gripper of the first operating mechanism of the robot.
Figure 43:
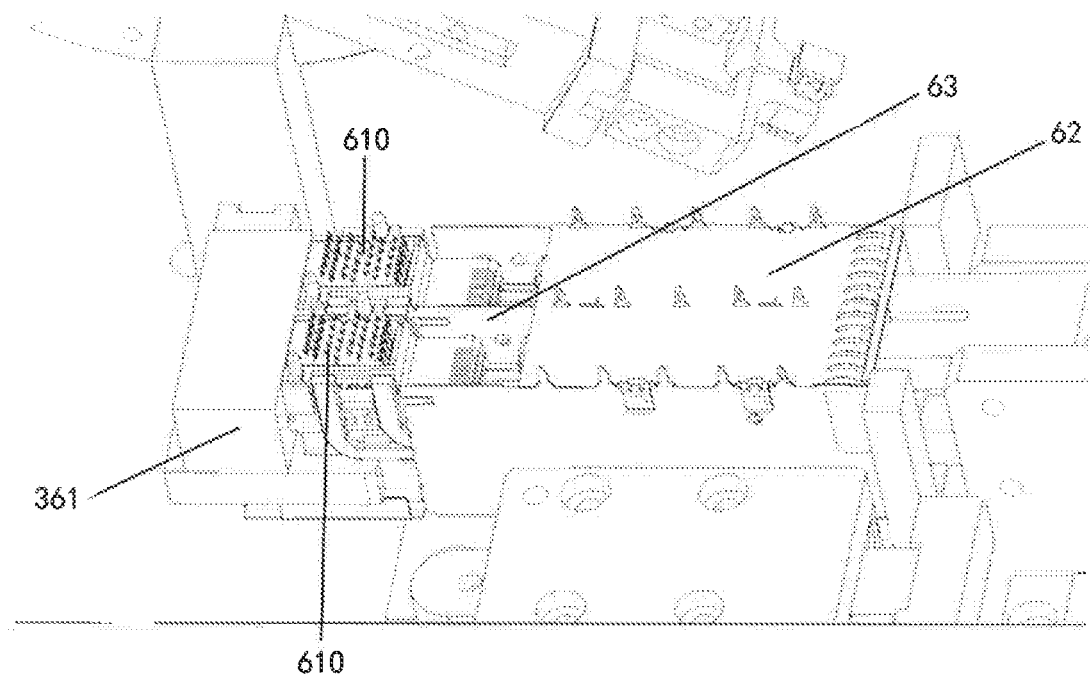
FIG. 43 is a perspective view of a process of pushing the two contact sub-assemblies to form a gap between the two contact sub-assemblies by a sixth gripper of the first operating mechanism.
Figure 44:
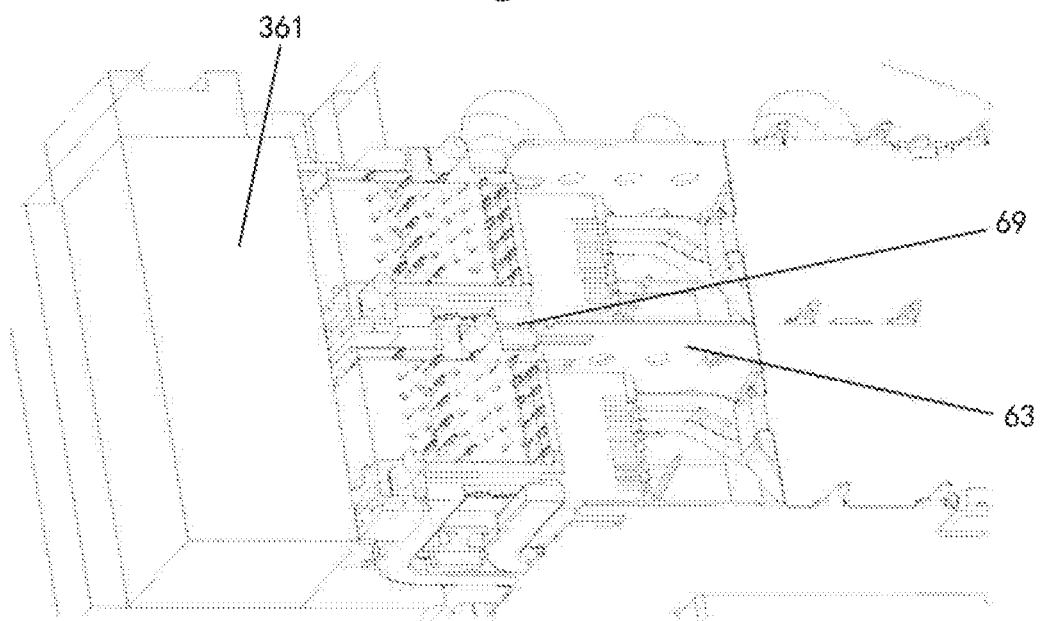
FIG. 44 is another perspective view of the process of pushing the two contact sub-assemblies to form the gap between the two contact sub-assemblies by the sixth gripper of the first operating mechanism.

In an embodiment, as shown in FIGS. 2 and 42, the first operating mechanism 3a of the robot 3 further comprises a sixth tool 36. The sixth tool 36 comprises a pushing block 361 and three pins 360 protruding from the pushing block 361 and arranged side by side. In use, as shown in FIGS. 43 and 44, two pins 360 at sides are configured to guide and hold the two contact sub-assemblies, the pin 360 at middle portion is configured to be inserted between the two contact subassemblies before inserting the two contact subassemblies 61 into the cage 62, so that the two contact subassemblies 61 are pre-separated, and a gap 39 is formed between the two contact subassemblies 61. The structure of the sixth tool 36 is not limited to the illustrated embodiments as long as it may separate the two contact subassemblies.

Figure 45:
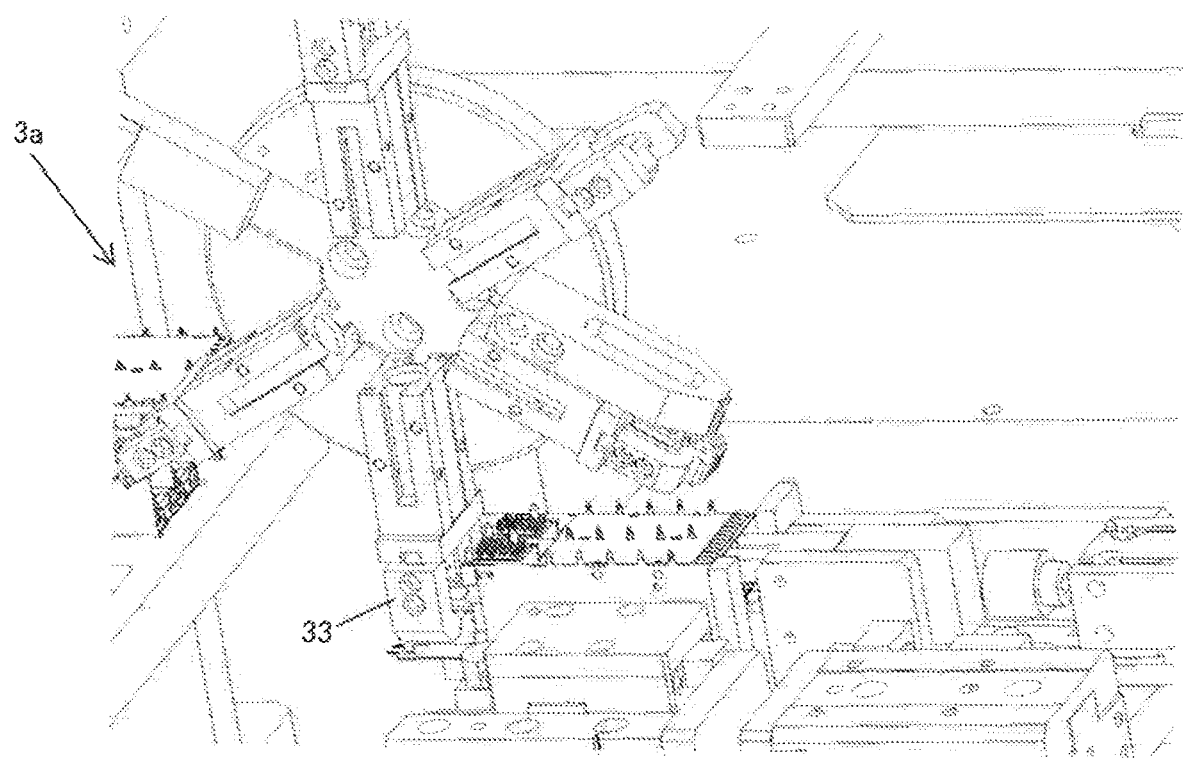
FIG. 45 is a perspective view of a process of pushing the two contact sub-assemblies into the cage by another gripper of the first operating mechanism.
Figure 46:
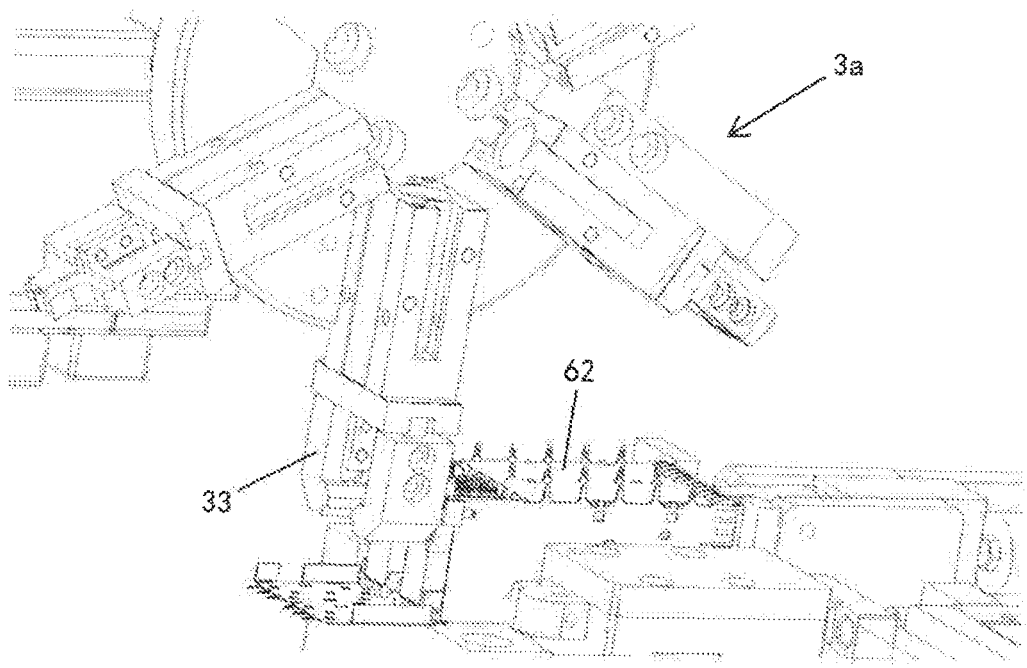
FIG. 46 is another perspective view of the process of pushing the two contact sub-assemblies into the cage by another gripper of the first operating mechanism.
Figure 47:
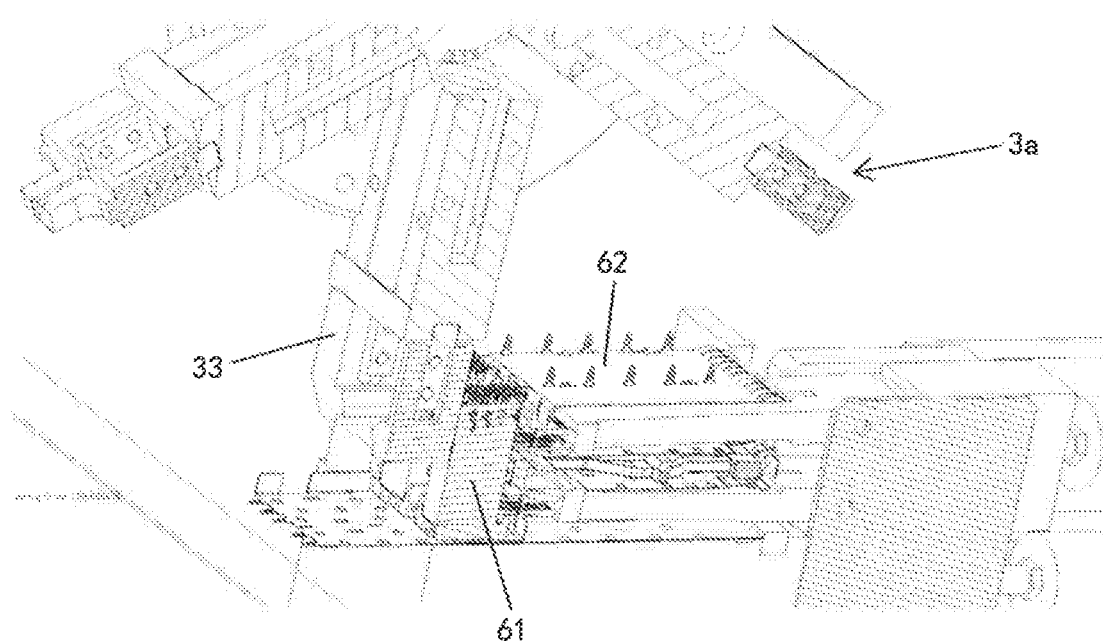
FIG. 47 is a sectional perspective view of the process of pushing the two contact sub-assemblies into the cage by another gripper of the first operating mechanism.

In a condition where the gap is formed between the two contact subassemblies by the pushing block 361 of the sixth tool 36, the middle vertical partition plate 63 of the cage 62 is inserted into the gap 39. Then, the sixth tool 36 is removed. Then, the two contact subassemblies are further pushed into the cage 62 by the third tool 33 of the first operating mechanism 3a, as shown in FIG. 45. In this way, when the two contact subassemblies are pushed into the cage 62 by the third tool 33 of the first operating mechanism 3a, the two contact subassemblies will not collide the middle vertical partition plate 63 of the cage 62, and the middle vertical partition plate 63 may be smoothly inserted into the gap 39 between the two contact subassemblies. FIGS. 45-47 show a state where the two contact subassemblies are pushed into the cage 62 by the third tool 33. It should be appreciated that the third tool 33 may be replaced by any other tool as long as it may push the two contact subassemblies into the cage 62.

A method of assembling the first connector assembly 6a by the robot assembling system according to the above embodiments will now be described. The method comprises the steps of:

S1: clamping the contact 61 and loading the contact 61 to the contact loading portion 11 of the first assembling workstation 1 by the first tool 31 of the robot 3;

S2: clamping the first light guide pipe 64 and loading the first light guide pipe 64 to the contact 61 by the second tool 32 of the robot 3;

S3: clamping the second light guide pipe 65 and loading the second light guide pipe 65 to the contact 61 by the third tool 33 of the robot 3;

S4: clamping the connection member 66 and loading the connection member 66 to the connection member loading portion 12 by the fourth tool 34 of the robot 3;

S5: moving the connection member loading portion 12 toward the contact loading portion 11 on the first assembling workstation 1, so that the connection member 66 is assembled to ends of the first and second light guide pipes 64, 65 to form the first contact subassembly;

S6: repeating the above steps S1-S5 to form the second contact subassembly;

S7: clamping the cage 62 and loading the cage 62 to the cage loading portion 21 of the second assembling workstation 2 by the fifth tool 35 of the robot 3;

S8: clamping the two contact subassemblies arranged side by side and placing the two contact subassemblies on a loading position aligned to the cage 62 by the fifth tool 65 of the robot 3; and S9: assembling the two contact subassemblies to the cage 62 to form the connector assembly 6a.

In an embodiment, the step S9 may comprise steps of:

S91: providing a guiding mechanism 22 on the second assembling workstation 2, wherein the guiding mechanism 22 is adapted to be inserted into the cage 62 and configured to guide the light guide pipe 64, 65 and the connection member 66 to be inserted between two horizontal partition plates 69a at each side of the cage without colliding with ends of the horizontal partition plates 69a; and S92: pushing the two contact subassemblies by any tool of the robot 3, so as to insert the two contact subassemblies into the cage 62 under the guidance of the guiding mechanism 22 to form the connector assembly.

In an embodiment, before the step S92, the method may further comprise a step of:

S93: providing a sixth tool 36 on the robot 3, and pre-separating the two contact subassemblies 61 by the sixth tool 36 before inserting the two contact subassemblies 61 into the cage 62, so that the two contact subassemblies 61 will not collide the middle vertical partition plate 63 of the cage 62 during insertion into the cage 62.

In another embodiment, the robot assembling system of FIG. 1 is used to assemble the second connector assembly 6b. The device and the process of assembling the second connector assembly 6b are similar to the first connector assembly 6a. Only the differences from assembling the first connector assembly 6a will be described in detail hereinafter.

Figure 5:
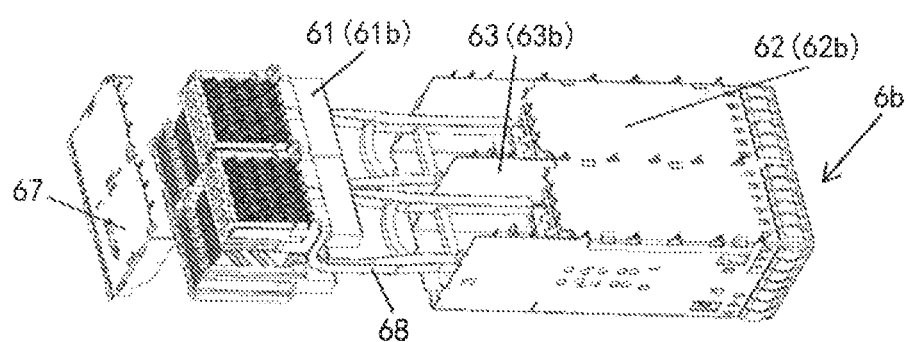
FIG. 5 is an exploded perspective view of a second connector assembly assembled by the robot assembling system of FIG. 1.
Figure 33:
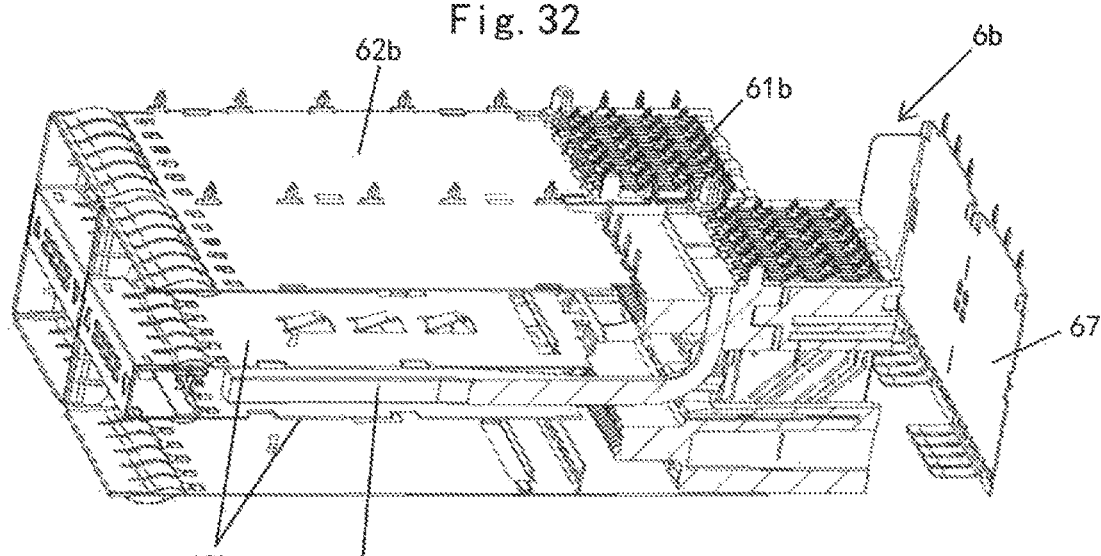
FIG. 33 is a sectional perspective view of the second connector assembly of FIG. 5.
Figure 35:
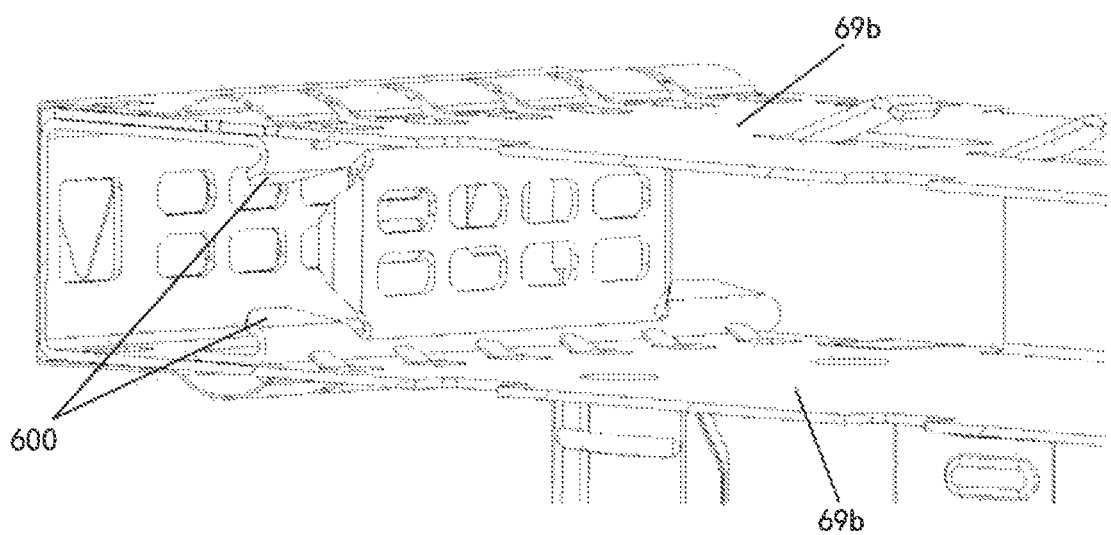
FIG. 35 is a sectional perspective view of a protrusion at an inner side of the horizontal partition plate in the cage of the second connector assembly.
Figure 36:
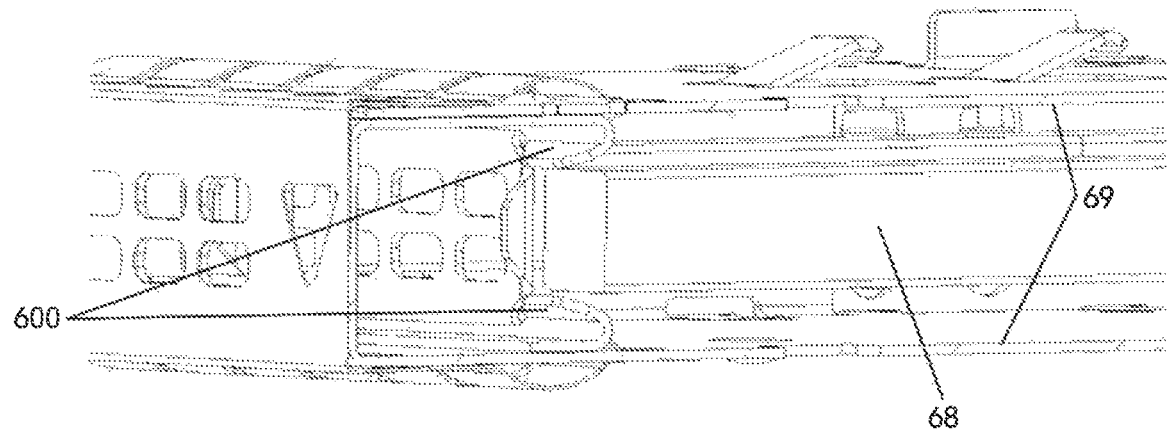
FIG. 36 is another sectional perspective view of the protrusion at the inner side of the horizontal partition plate in the cage of the second connector assembly.

FIG. 5 is an exploded perspective view of the second connector assembly 6b. FIG. 33 is a cross sectional view showing the structure of the second connector assembly 6b. FIGS. 35 and 36 show the protrusion 600 at the inner side of the horizontal partition plate 69b in the cage 62b of the second connector assembly 6b. As shown in FIGS. 5 and 35-36, the second connector assembly 6b comprises two contacts 61b mounted in two chambers which are located at left and right sides of the cage 62b and separated by the middle vertical partition plate 63b. There are provided two horizontal partition plates 69b at left and right sides of the middle vertical partition plate 63b, respectively. Each of the two contacts 61b comprises a light guide pipe 68. A protrusion 600 is formed at an inner side of two horizontal partition plates 69b at each side of the middle vertical partition plate 63b of the cage 62b, and the protrusion 600 is located on a passing path of the light guide pipe 68. As shown in FIG. 5, the second connector assembly 6b may further comprise a rear cover 67.

In order to assemble the second connector assembly 6b, the robot 3 uses the second operating mechanism 3b shown in FIG. 3. FIG. 3 shows a working state of the second operating mechanism 3b of the robot 3 shown in FIG. 1. The second operating mechanism 3b comprises a first tool 31b configured to clamp the contact 61b and load the contact 61b to the contact loading portion of the first assembling workstation 1, a second tool 32b configured to clamp the light guide pipe 68 and load the light guide pipe 68 to the contact 61b, and a third tool 33b configured to clamp the cage 62b and load the cage 62b to the cage loading portion 21.

Figure 34:
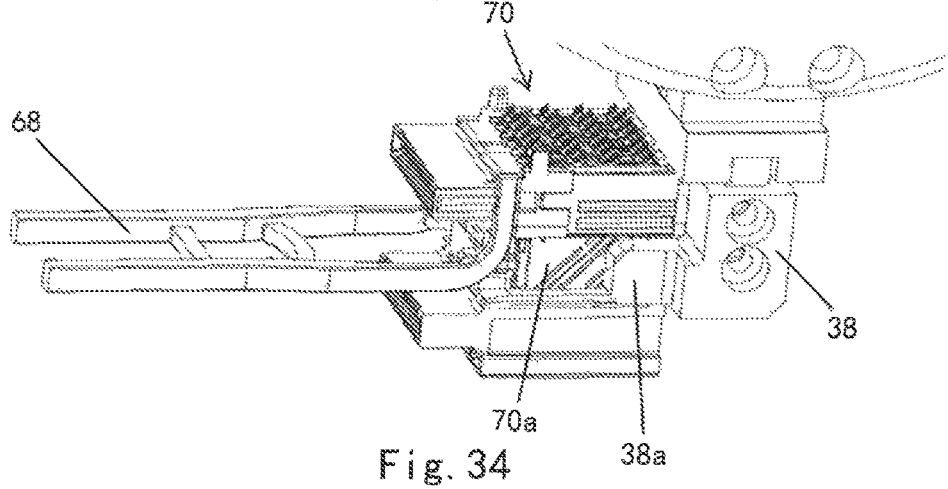
FIG. 34 is a perspective view of the tool for the contact subassembly of the second connector assembly.

As shown in FIG. 3, the second operating mechanism 3b may further comprise a fourth tool 37 configured to clamp a rear cover 67 and load the rear cover 67 to the cage 62b and a fifth tool 38 configured to clamp the contact subassembly 70 and load the contact subassembly 70 to cage 62. It should be appreciated for those skilled in this art that other tools may be added on the second operating mechanism 3b as needed. As shown in FIG. 3, each tool on the second operating mechanism 3b has a mating structure corresponding to a structure of a respective component to be gripped, so as to grip the respective component. For example, FIG. 34 is an enlarged view of the fifth tool 38 for clamping the contact subassembly 70. As shown in FIG. 34, the fifth tool 38 comprises a claw 38a. The claw 38a has the size and the shape corresponding to those of a groove 70a in the respective contact subassembly 70, so as to clamping the contact subassembly 70 by mating the claw 38a with the groove 70a.

Figure 37:
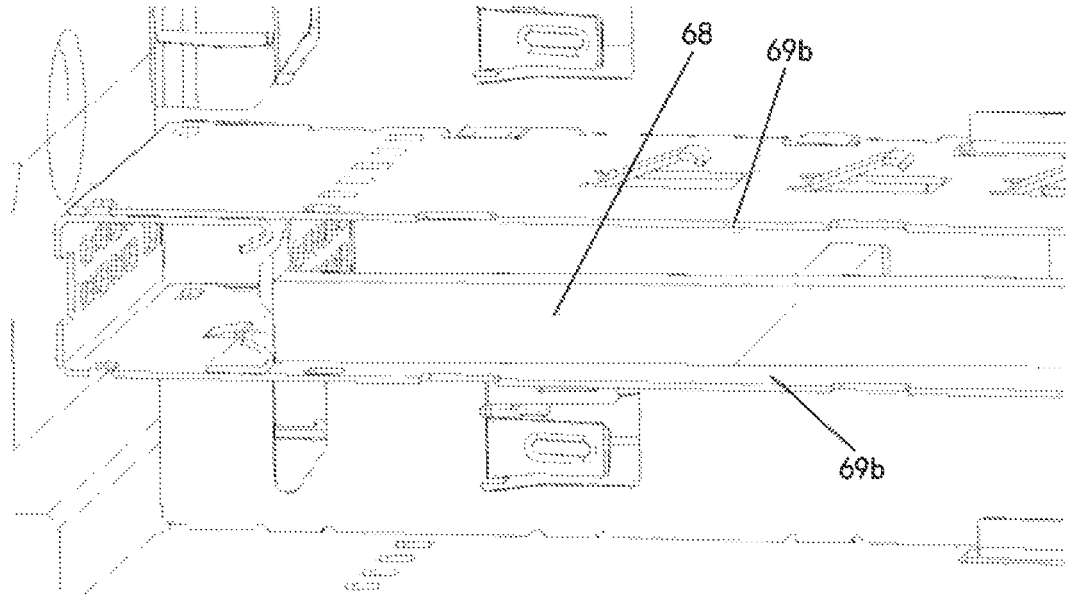
FIG. 37 is a sectional perspective view showing a collision between the protrusion of the cage and the light guide pipe in the absence of the guiding mechanism.
Figure 38:
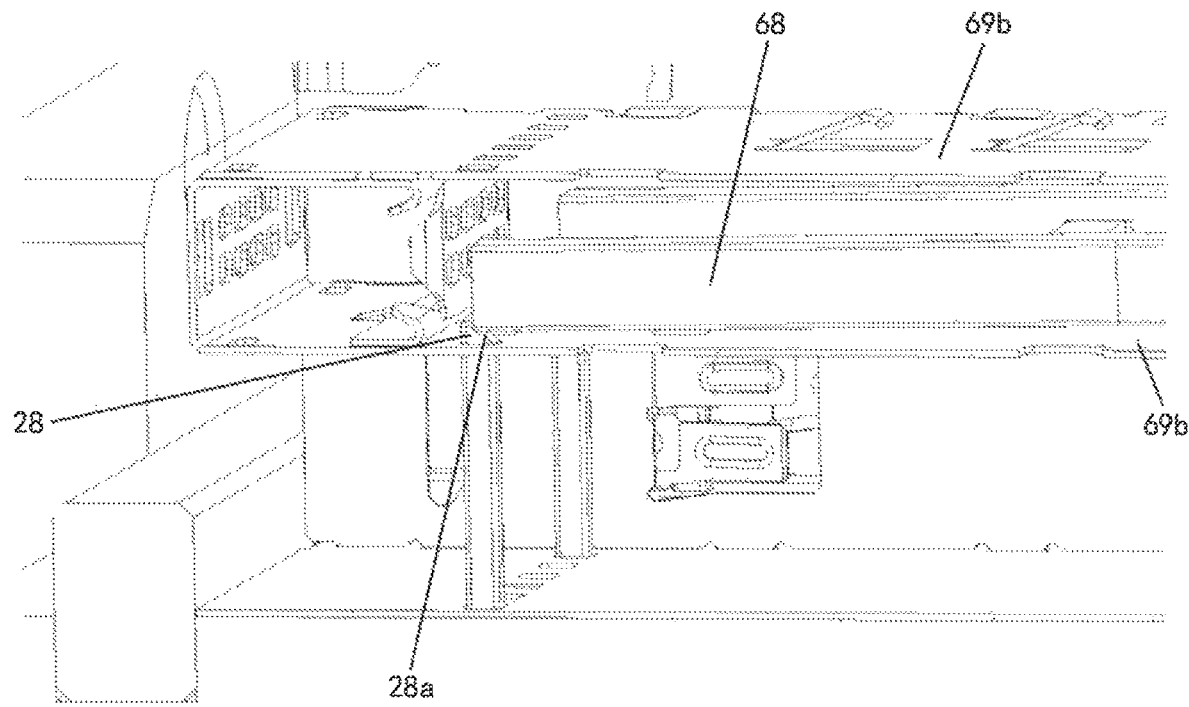
FIG. 38 is a sectional perspective view of a first step of guiding the insertion of the light guide pipe by the guiding pin of the second assembling workstation.
Figure 39:
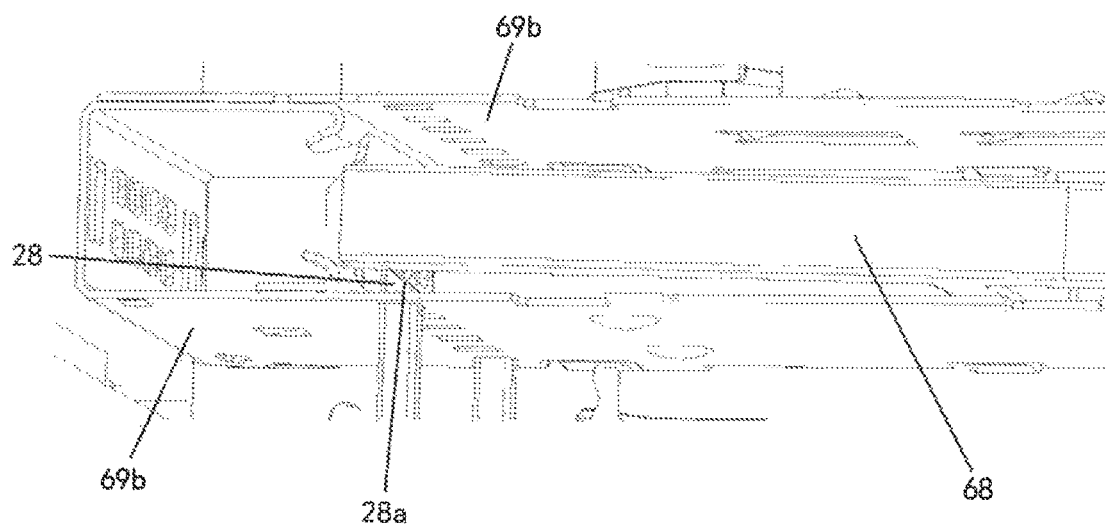
FIG. 39 is a sectional perspective view of a second step of guiding the insertion of the light guide pipe by the guiding pin of the second assembling workstation.

As shown in FIG. 37, in the absence of the guiding mechanism 22, when the light guide pipe 68 is inserted into a space between the two horizontal partition plates 69b, the light guide pipe 68 will interfere and collide with the protrusion 600 on the cage 62. In order to avoid the interference, as shown in FIGS. 38 and 39, in an embodiment, a guiding mechanism is provided on the second assembling workstation 2. The guiding mechanism may comprise a guiding pin 28 provided with a guiding slope face 28a. When the light guide pipe 68 is inserted between the horizontal partition plates, the guiding slope face 28a of the guiding pin 28 guides the insertion of the light guide pipe 68, so as to avoid the interference with the protrusion 600 on the cage 62.

Figure 40:
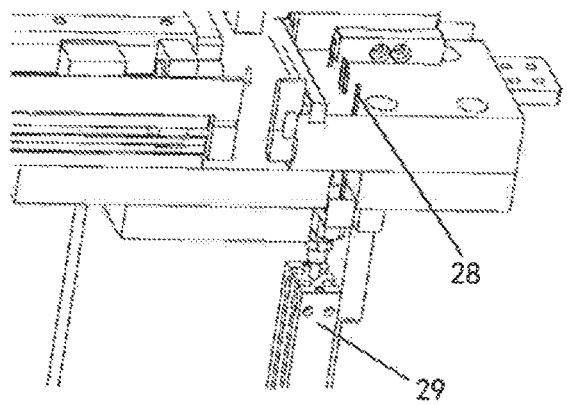
FIG. 40 is a perspective view of the guiding pin moved up to a work position.
Figure 41:
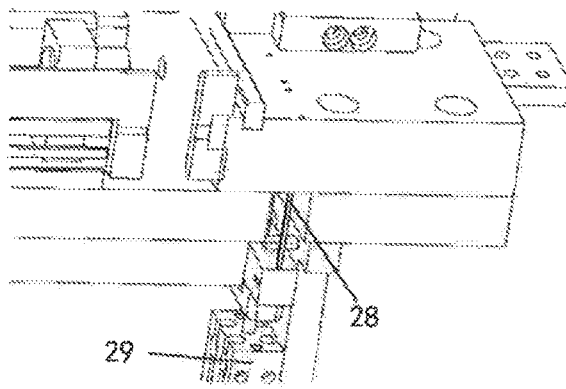
FIG. 41 is a perspective view of the guiding pin moved down to a spare position.

As shown in FIGS. 40 and 41, the second assembling workstation 2 further comprises a driving mechanism 29 configured to drive the guiding pin 28 to move up and down, so that the guiding pin 28 is moved up to a work position to guide the insertion of the light guide pipe 68 when the light guide pipe 68 is inserted between the horizontal partition plates 69b, and is moved down to a spare position when the light guide pipe 68 is not inserted. FIG. 40 shows the guiding pin 28 moved up to the work position and FIG. 41 shows the guiding pin moved down to the spare position.

A method of assembling the second connector assembly 6b by the robot assembling system according to the above embodiments will now be described. The method may comprise steps of:

S1: clamping the contact 61b and loading the contact 61b to the contact loading portion 11 of the first assembling workstation 1 by the first tool 31b of the robot 3;

S2: clamping the light guide pipe 68 and loading the light guide pipe 68 to the contact 61b by the second tool 32b of the robot, so as to form the first contact subassembly;

S3: repeating the above steps S1-S2 to form the second contact subassembly;

S4: clamping the cage 62b and loading the cage 62b to the cage loading portion 21 of the second assembling workstation by the third tool 33b of the robot 3;

S5: clamping the two contact subassemblies arranged side by side and placing the two contact subassemblies on a loading position aligned to the cage 62b by the third tool 33b of the robot 3; and S6: assembling the two contact subassemblies to the cage 62b to form the connector assembly 6b.

In an embodiment, the above step S6 may comprise steps of:

S61: providing a guiding mechanism 28 on the second assembling workstation 2, wherein the guiding mechanism 28 is configured to guide the light guide pipe 68 to be inserted between two horizontal partition plates 69b at each side of the cage 62 without colliding the protrusion 600 of the horizontal partition plates 69b; and S62: pushing the two contact subassemblies by any tool of the robot 3, so as to insert the two contact subassemblies into the cage 62 under the guidance of the guiding mechanism 28 to form the connector assembly 6b.

In the above various exemplary embodiments, the robot assembling system and method as well as the robot automatically assemble the connector assemblies 6a, 6b, which greatly improves the efficiency of assembling the connector assembly 6a, 6b and saves cost. Furthermore, the connector assembly 6a, 6b is reliably assembled accurately and interference among the components of the connector assembly 6a, 6b is avoided in the assembly process.

What is claimed is:

1. A robot assembling system, comprising:
a first assembling workstation configured to assemble a contact of a connector assembly and a light guide pipe of the connector assembly to form a contact subassembly;
a second assembling workstation configured to assemble the contact subassembly and a cage to form the connector assembly, the connector assembly including:
the cage having a middle vertical partition plate and a plurality of horizontal partition plates connected to each side of the middle vertical partition plate, the middle vertical partition plate and the horizontal partition plates dividing an inner space of the cage into a plurality of chambers;
the contact mounted in one of the chambers of the cage; and
the light guide pipe mounted on the contact and extending into a space defined between the horizontal partition plates; and
a robot configured to transmit the cage, the light guide pipe, the contact, or the contact subassembly between the first assembling workstation and the second assembling workstation and configured to assist an assembling operation at the first assembling workstation and the second assembling workstation.

2. The robot assembling system of claim 1, wherein the robot includes a rotatable operating mechanism including a rotary disc and a plurality of tools arranged on the rotary disc along a circumferential direction of the rotary disc and adapted to manipulate different operation objects, and when the rotary disc is rotated to an operation position of one of the plurality of tools, the one tool is adapted to manipulate the operation object and other tools of the plurality of tools are in a non-operation position.

3. The robot assembling system of claim 2, wherein the robot includes a plurality of interchangeable operating mechanisms configured to assemble different types of connector assemblies.

4. The robot assembling system of claim 2, wherein
the robot assembling system is adapted to assemble a first connector assembly, the first connector assembly comprising a pair of contacts mounted in a pair of chambers which are located at a pair of opposite sides of the cage and separated by the middle vertical partition plate;
the pair of contacts each have a first light guide pipe and a second light guide pipe which are integrated together by a connection member at an end of each of the first light guide pipe and the second light guide pipe;
the first assembling workstation includes a contact loading portion configured to load each contact and a connection member loading portion configured to load the connection member;
the second assembling workstation includes a cage loading portion configured to load the cage; and
the plurality of tools of the robot include a first tool configured to clamp each contact and load the contact to the contact loading portion, a second tool configured to clamp the first light guide pipe and load the first light guide pipe to the contact, a third tool configured to clamp the second light guide pipe and load the second light guide pipe to the contact, a fourth tool configured to clamp the connection member and load the connection member to the connection member loading portion, and a fifth tool configured to clamp the cage and load the cage to the cage loading portion.

5. The robot assembling system of claim 4, wherein the connection member loading portion is configured to be movable toward the contact loading portion in a first direction, so as to move the connection member to a position near the ends of the first light guide pipe and the second light guide pipe which have been mounted on the contact.

6. The robot assembling system of claim 5, wherein the first assembling workstation comprises:
a contact holding portion configured to fix the contact;
a first driving mechanism configured to drive the connection member loading portion to move in the first direction; and
a second driving mechanism configured to drive the contact holding portion to move in a second direction perpendicular to the first direction.

7. The robot assembling system of claim 5, wherein the connection member loading portion includes an air nozzle block having a plurality of air nozzles and configured to push the connection member and assemble the connection member on the first light guide pipe and the second light guide pipe.

8. The robot assembling system of claim 4, wherein the second assembling workstation comprises a guiding mechanism adapted to be inserted into the cage and configured to guide the first light guide pipe, the second light guide pipe, and the connection member to be inserted between two horizontal partition plates at each side of the cage without colliding with ends of the horizontal partition plates.

9. The robot assembling system of claim 8, wherein the guiding mechanism includes a pair of cover plates adapted to be covered on an outer side of the two horizontal partition plates at each side of the cage, each cover plate includes a hook formed on an end of the cover plate and configured to cover the ends of the horizontal partition plates, the hook has a guiding slope face formed on an outer side of the hook and configured to guide the first light guide pipe, the second light guide pipe, and the connection member to be inserted between the two horizontal partition plates.

10. The robot assembling system of claim 9, wherein the cover plates of the guiding mechanism are configured to be pivotally opened and closed relative to each other, and the ends of the horizontal partition plates are covered by the hooks of the cover plates when the cover plates are closed.

11. The robot assembling system of claim 10, a spring is provided between the cover plates and is configured to close the cover plates by biasing the cover plates.

12. The robot assembling system of claim 11, wherein an inclined surface is formed on an end of each cover plate opposite to the hook, and the second assembling workstation includes a U-shaped member including a pair of sidewalls on ends of which an inclined face mated with the inclined surface is formed so that a distance between the cover plates is changeable when the inclined face of the U-shaped member slides along the inclined surface of the cover plates.

13. The robot assembling system of claim 11, wherein the second assembling workstation includes a first driving mechanism configured to drive the guiding mechanism to move into or out of the cage, and a second driving mechanism configured to drive the U-shaped member to move toward or away from the guiding mechanism.

14. The robot assembling system of claim 4, wherein the robot includes a sixth tool having a pin, the pin being configured to be inserted between a pair of contact subassemblies before inserting the contact subassemblies into the cage, so that the contact subassemblies are pre-separated and will not collide with the middle vertical partition plate of the cage during insertion into the cage.

15. The robot assembling system of claim 4, wherein the second tool includes:
a pair of claws each having a slot to receive a pair of legs of the first light guide pipe therein, the claws configured to be moved toward or away from each other; and
a supporting member configured to support the first light guide pipe, a protruding rib is formed on the supporting member and a groove for positioning a lateral rod of the light guide pipe is formed in the protruding rib.

16. The robot assembling system of claim 4, wherein the third tool includes a pair of claws each having a shoulder for supporting and clamping a pair of legs of the second light guide pipe, the claws being movable toward or away from each other.

17. The robot assembling system of claim 2, wherein
the robot assembling system is adapted to assemble a second connector assembly, the second connector assembly including a pair of contacts mounted in a pair of chambers which are located at a pair of opposite sides of the cage and separated by the middle vertical partition plate;
the pair of contacts each have a light guide pipe;
a protrusion is formed at an inner side of each of two horizontal partition plates disposed at each side of the middle vertical partition plate of the cage, and the protrusion is located on a passing path of the light guide pipe;
the first assembling workstation comprises a contact loading portion configured to load the contact;
the second assembling workstation comprises a cage loading portion configured to load the cage; and
the plurality of tools of the robot include a first tool configured to clamp each contact and load the contact to the contact loading portion, a second tool configured to clamp the light guide pipe and load the light guide pipe to the contact, and a third tool configured to clamp the cage and load the cage to the cage loading portion.

18. The robot assembling system of claim 17, wherein the robot includes a fourth tool configured to clamp a rear cover of the cage and load the rear cover to the cage, and a fifth tool configured to clamp the contact subassembly and load the contact subassembly to the cage.

19. The robot assembling system of claim 17, wherein the second assembling workstation includes a guiding mechanism configured to guide the light guide pipe to be inserted between two horizontal partition plates at each side of the cage without colliding with the protrusion of the horizontal partition plates.

20. The robot assembling system of claim 19, wherein the guiding mechanism includes a guiding pin having a guiding slope face configured to guide the insertion of the light guide pipe.

21. The robot assembling system of claim 20, wherein the second assembling workstation includes a driving mechanism configured to drive the guiding pin to move up and down, so that the guiding pin is moved up to a work position to guide the insertion of the light guide pipe when the light guide pipe is inserted between the horizontal partition plates, and is moved down to a spare position when the light guide pipe is not inserted.

22. A method of assembling a connector assembly by the robot assembling system according to claim 4, comprising:
clamping the contact and loading the contact to the contact loading portion of the first assembling workstation by the first tool of the robot;
clamping the first light guide pipe and loading the first light guide pipe to the contact by the second tool of the robot;
clamping the second light guide pipe and loading the second light guide pipe to the contact by the third tool of the robot;
clamping the connection member and loading the connection member to the connection member loading portion by the fourth tool of the robot;
moving the connection member loading portion toward the contact loading portion on the first assembling workstation, so that the connection member is assembled to ends of the first light guide pipe and second light guide pipes to form a first contact subassembly;
repeating the clamping and moving steps to form a second contact subassembly;
clamping the cage and loading the cage to the cage loading portion of the second assembling workstation by the fifth tool of the robot;
clamping the first contact subassembly and the second contact subassembly arranged side by side and placing the first contact subassembly and the second contact subassembly on a loading position aligned to the cage by the fifth tool of the robot; and
assembling the first contact subassembly and the second contact subassembly to the cage to form the connector assembly.

23. The method of claim 22, wherein the assembling step comprises:
providing a guiding mechanism on the second assembling workstation, the guiding mechanism is adapted to be inserted into the cage and configured to guide the first light guide pipe, the second light guide pipe, and the connection member to be inserted between two horizontal partition plates at each side of the cage without colliding with ends of the horizontal partition plates; and
pushing the first contact subassembly and the second contact subassembly by any tool of the robot to insert the first contact subassembly and the second contact subassembly into the cage under the guidance of the guiding mechanism to form the connector assembly.

24. The method of claim 23, further comprising, before the pushing step, providing a sixth tool on the robot and pre-separating the first contact subassembly and the second contact subassembly by the sixth tool before inserting the first contact subassembly and the second contact subassembly into the cage, so that the first contact subassembly and the second contact subassembly will not collide with the middle vertical partition plate of the cage during insertion into the cage.

25. A method of assembling a connector assembly by the robot assembling system according to claim 17, comprising steps of:
- clamping the contact and loading the contact to the contact loading portion of the first assembling workstation by the first tool of the robot;
- clamping the light guide pipe and loading the light guide pipe to the contact by the second tool of the robot, so as to form a first contact subassembly;
- repeating the clamping steps to form a second contact subassembly;
- clamping the cage and loading the cage to the cage loading portion of the second assembling workstation by the third tool of the robot;
- clamping the first contact subassembly and the second contact subassembly arranged side by side and placing the first contact subassembly and the second contact subassembly on a loading position aligned to the cage by the third tool of the robot; and
- assembling the first contact subassembly and the second contact subassembly to the cage to form the connector assembly.

26. The method of claim 25, wherein the assembling step comprises:
- providing a guiding mechanism on the second assembling workstation, the guiding mechanism is configured to guide the light guide pipe to be inserted between two horizontal partition plates at each side of the cage without colliding with the protrusion of the horizontal partition plates; and
- pushing the first contact subassembly and the second contact subassembly by any tool of the robot to insert the first contact subassembly and the second contact subassembly into the cage under the guidance of the guiding mechanism to form the connector assembly.

* * * * *